(12) United States Patent
Kai

(10) Patent No.: US 8,787,757 B2
(45) Date of Patent: Jul. 22, 2014

(54) OPTICAL COMMUNICATION NETWORK AND SUPERVISORY CONTROL DEVICE

(75) Inventor: Yutaka Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 194 days.

(21) Appl. No.: 12/946,844

(22) Filed: Nov. 15, 2010

(65) Prior Publication Data

US 2011/0116798 A1     May 19, 2011

(30) Foreign Application Priority Data

Nov. 16, 2009   (JP)  ................ 2009-260658

(51) Int. Cl.
*H04B 10/20*     (2006.01)
*H04B 10/17*     (2006.01)
*H04B 10/00*     (2013.01)
*G02B 6/28*     (2006.01)

(52) U.S. Cl.
USPC ............... 398/58; 398/30; 398/43; 398/25; 398/192; 359/334; 359/332; 359/249

(58) Field of Classification Search
USPC ...................................... 398/58, 30
See application file for complete search history.

(56) References Cited

U.S. PATENT DOCUMENTS

| | | | |
|---|---|---|---|
| 6,194,707 B1 * | 2/2001 | Yang .................. | 250/227.15 |
| 6,654,513 B1 * | 11/2003 | Liden et al. .......... | 385/24 |
| 7,362,498 B1 | 4/2008 | Li et al. | |
| 2001/0003550 A1 * | 6/2001 | Yamaguchi .......... | 385/24 |
| 2003/0039010 A1 * | 2/2003 | Akimoto et al. ..... | 359/152 |
| 2006/0285846 A1 * | 12/2006 | Uekama et al. ...... | 398/30 |
| 2009/0110398 A1 * | 4/2009 | Pfeiffer ............... | 398/63 |

FOREIGN PATENT DOCUMENTS

| | | |
|---|---|---|
| JP | 5-22234 A | 1/1993 |
| JP | 8-298486 A | 11/1996 |
| JP | 2002-523921 | 7/2002 |
| JP | 2008-166719 A | 7/2008 |
| WO | WO-00/10268 | 2/2000 |

OTHER PUBLICATIONS

Kurosawa Translation.*
Nishimura Translation.*
K., Shimizu et al., "Supervisory signa I transmission experiments over 10000 km by modulated ASE of EDFA's," Electron. Lett., vol. 29, No. 12, pp. 1081-1083, Jun. 10, 1993.
Japanese Office Action mailed Sep. 3, 2013 for corresponding Japanese Application No. 2009-260658 with Partial English-language Translation.

* cited by examiner

*Primary Examiner* — Oommen Jacob
(74) *Attorney, Agent, or Firm* — Fujitsu Patent Center

(57) ABSTRACT

An optical communication network includes a plurality of optical transmission devices, a communication path, an optical repeater, and a supervisory controller that includes a supervisory control information sender which is installed on at least one of one of the optical transmission devices and the optical repeater and controls a drive signal supplied to a semiconductor optical amplifier that amplifies and outputs input signal light onto the communication path on the basis of the supervisory control information, and a supervisory control information receiver that receives the light which has been output from a semiconductor optical amplifier and transmitted through the communication path, converts the received light to an electric signal and identifies the supervisory control information on the basis of an intensity-modulated component of the total power of the electric signal in at least the other of one of the optical transmission devices and the optical repeater.

13 Claims, 15 Drawing Sheets

OPTICAL COMMUNICATION NETWORK AND SUPERVISORY CONTROL DEVICE

CROSS-REFERENCE TO RELATED APPLICATIONS

This application is based upon and claims the benefit of priority of the prior Japanese Patent Application No. 2009-260658, filed on Nov. 16, 2009, the entire contents of which are incorporated herein by reference.

FIELD

The embodiments discussed herein are related to an optical communication network and a supervisory control device that perform supervisory control on a device disposed on a communication path.

BACKGROUND

As one form of the optical communication network, a passive optical network (PON) of a configuration, for example, as illustrated in FIG. 1 is proposed and is applied to an optical access network or the like. In the PON illustrated in FIG. 1, an OLT (Optical Line Terminal) 101 which is disposed on the side of a communication server is connected with a plurality of ONUs (Optical Network Units) 104 which are disposed on the sides of users via an optical fiber 102 and an optical splitter 103. For example, 32 to 64 ONUs 104 are disposed. Signal light is sent and received bi-directionally between the OLT 101 and each ONU 104. For example, in a network which is called a G-PON (Gigabit-Passive Optical Network) or a GE-PON (Gigabit Ethernet-Passive Optical Network), signal light is sent and received at a communication speed of 1 gigabit/sec (Gbps). In a general type PON as mentioned above, a communication path between the OLT 101 and each ONU 104 is configured by using only passive components. Thus, in general, a redundancy optical circuit is not adopted and it may be basically unnecessary to perform supervisory control on a device disposed on the communication path. For example, a distance between the OLT 101 and each ONU 104 ranges from about 10 km to about 20 km.

Incidentally, in a PON of the above mentioned type, it is expected that needs will emerge for increasing a transmission distance and the number of users (the number of branch signals which are obtained by using an optical splitter) with increasing the communication speed of the optical access network. In general, in order to promote elongation of the communication distance in the G-PON or the GE-PON, it is proposed to cope with elongation of the communication distance by converting an optical signal to an electric signal on an intermediate part of the communication path, performing optical 2R regeneration including a reamplification function and a reshaping function or optical 3R regeneration including the reamplification function, the reshaping function and a retiming function on the signal and again sending the regenerated signal light onto the communication path. However, as a configuration to be applied to a network handling high-speed signal light which is higher than 10 Gbps such as a 10GE-PON, an XG-PON or the like, the configuration that performs the optical 2R or 3R regeneration on the signal on an intermediate part of the communication path may be costly. In particular, up-signal light which is directed from each ONU to the OLT in the optical access network is sent in the form of an optical burst signal. Thus, it may be desired to install a high-speed optical burst signal receiver in order to perform the optical 2R or 3R regeneration on the signal on an intermediate part of the communication path and hence the cost of the configuration may be relatively increased.

Though different from the PON, a system in which an optical repeater (optical repeating installation) which is configured by using an optical amplifier or the like is disposed on a communication path and the amplitude of signal light is amplified as it is without being converted to an electric signal and is relay-transmitted, instead of performing the optical 2R or 3R regeneration on the signal on an intermediate part of the communication path is proposed for use in an optical communication network which is adopted in a main line system or the like. In the above mentioned system, in order to smoothly perform duties such as sending of a notification when a failure has occurred, periodical maintenance and others, supervisory control of the optical repeater using an active component may be desired.

In general, in an existing optical communication network, supervisory control of the optical repeater or the like is performed by using a circuit which is different from a circuit used for signal light communication or by using a wavelength which is different from the wavelength of the signal light so as to transmit supervisory control signal light on the network. In a supervisory control system as mentioned above, the transmission capacity of the signal light is limited owing to transmission of the supervisory control signal light and hence the above mentioned system may be unsuited to construct an optical communication network which aims at cost reduction such as an optical access network or the like.

As an existing technique for realizing supervisory control of an optical repeater or the like at a low cost, a system of transmitting supervisory control information using a circuit and a wavelength which are the same as those used for transmission of a signal light, for example, by carrying the supervisory control information on a tone signal and superimposing the tone signal on the signal light is proposed. In addition, a technique for transmitting supervisory control information by superimposing a tone signal on ASE (Amplified Spontaneous Emission) light which is generated using an optical amplifier such as an erbium doped fiber amplifier (EDFA) or the like is proposed.

However, in an existing system of transmitting the supervisory control information by superimposing the tone signal on the signal light as described above, if the signal light is not present, transmission of the supervisory control information may be impossible and hence the above mentioned system may not be applied to a network on which an intermittent optical burst signal is transmitted as in the case of transmission of the up-signal light from each ONU to the OLT on the above mentioned optical access network.

SUMMARY

An optical communication network includes a plurality of optical transmission devices that send or receive signal light, a communication path that couples the optical transmission devices to one another, an optical repeater which is disposed on the communication path to amplify and output the signal light which is transmitted through the communication path; and a supervisory controller that includes, a supervisory control information sender which is installed on at least one of one of the optical transmission devices and the optical repeater and controls a drive signal supplied to a semiconductor optical amplifier that amplifies and outputs input signal light onto the communication path based on the supervisory control information to intensity-modulate the total power of light which includes spontaneously emitting light which is output from the semiconductor optical amplifier, and a supervisory control information receiver that receives the light which has been output from a semiconductor optical amplifier and transmitted through the communication path, converts the received light to an electric signal and identifies the supervisory control information on the basis of an intensity-modulated component of the total power of the electric signal in at least the other of one of the optical transmission devices and the optical repeater, and that transmits supervisory control information between the optical transmission device and the optical repeater to perform supervisory control on the optical repeater.

The object and advantages of the disclosed embodiments will be realized and attained by at least the features, elements, and combinations particularly pointed out in the claims.

It is to be understood that both the foregoing general description and the following detailed description are exemplary and explanatory and are not restrictive of the disclosed embodiments, as claimed.

DESCRIPTION OF EMBODIMENTS

In the existing technique for transmitting the supervisory control information by superimposing the tone signal on the ASE light, the power of the ASE light which is generated using an optical amplifier such as the EDFA or the like is changed depending on the power of light which is into the optical amplifier. Therefore, in the case that the optical burst signal is input into the above mentioned optical amplifier, the tone signal will be superimposed on the ASE light the power level of which is intermittently changed. In addition, in the case that an EDFA of the type which is not configured to cope with high-speed response is used, an optical surge may be possibly generated when the input light power is suddenly changed as observed on an edge part of the optical burst signal. Therefore, it may be difficult to extract and identify the tone signal which is superimposed on the ASE light generated using the EDFA or the like on the sink side.

That is, an optical repeater using an active component such as an optical amplifier or the like is installed on a communication path so as to cope with the needs for increasing the transmission distance and the number of users in the PON with increasing the communication speed of the optical access network. In the above mentioned case, even when it is intended to realize supervisory control of the optical repeater at a low cost by applying an existing technique, such a problem may occur that it is difficult to cope with even the optical burst signal and hence it may be unavoidable to apply a high-cost supervisory control system. Such a problem as mentioned above may occur not only when the transmission distance is to be increased in the PON, but also when a supervisory control system which operates regardless of the form of signal light (for example, an optical burst signal or the like) used is to be realized at a low cost in a place where no supervisory control has not been performed so far in an optical communication network in which an active component is disposed on a communication path.

Next, various embodiments will be described in detail with reference to the accompanying drawings.

Figure 1:
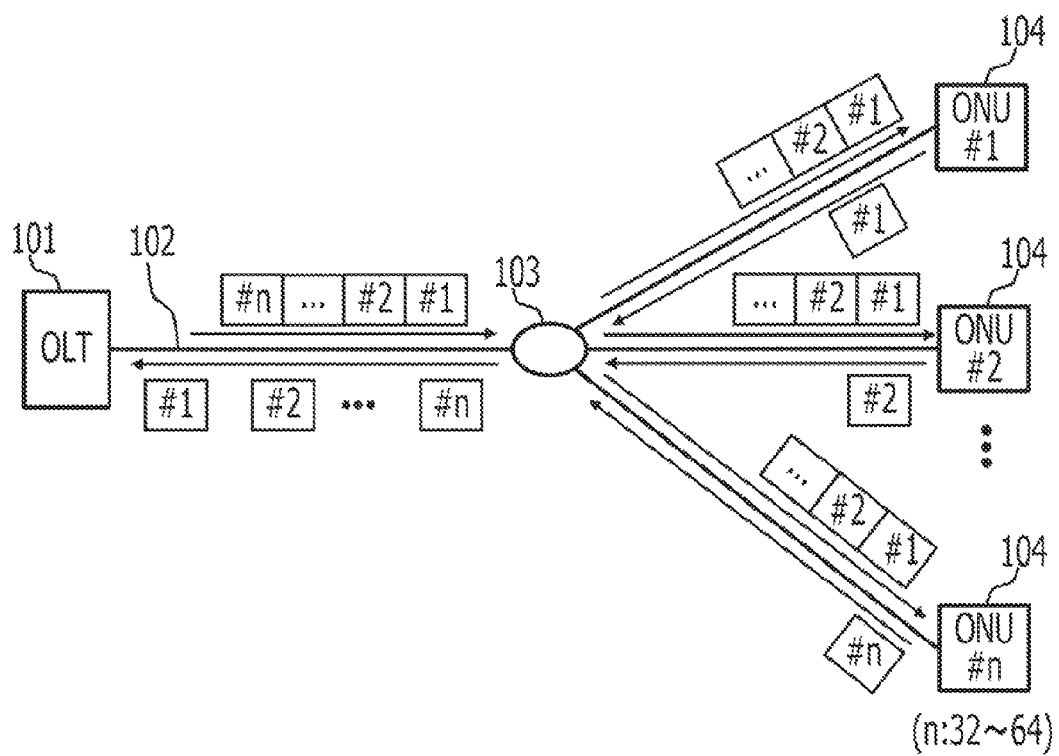
FIG. 1 is a diagram illustrating an example of a configuration of a general PON.
Figure 2:
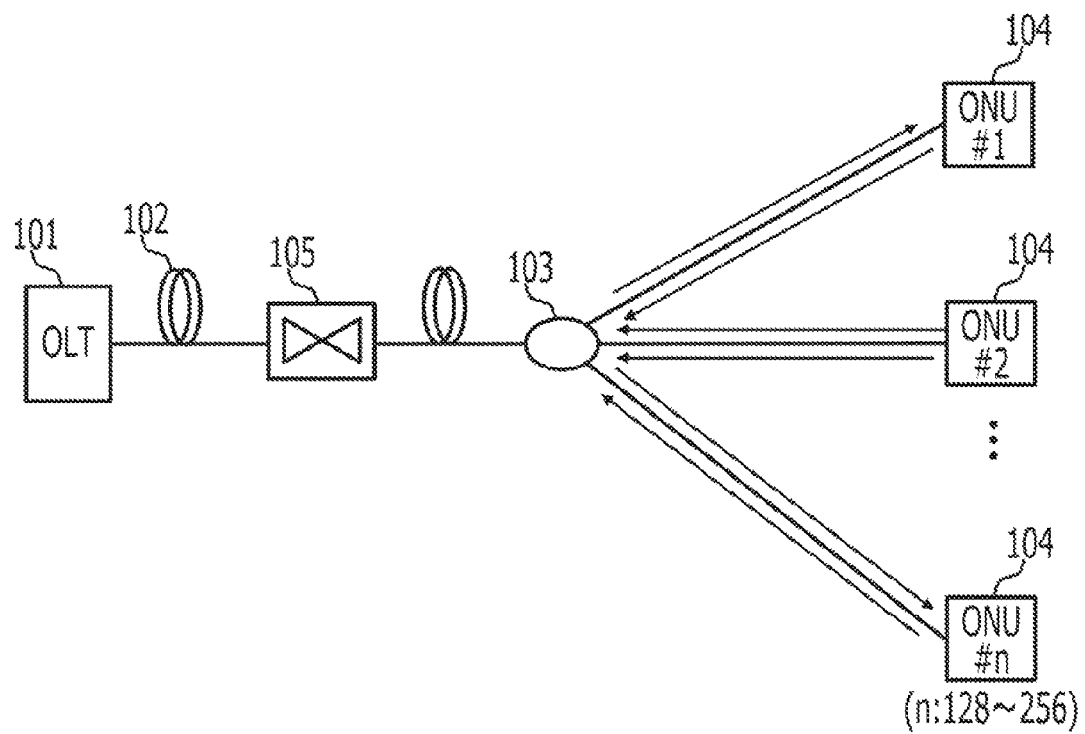
FIG. 2 is a diagram illustrating an example of a configuration in which an optical repeater is disposed on a communication path illustrated in FIG. 1.

FIG. 2 is a diagram illustrating an example in which an optical repeater is applied to a general PON illustrated in FIG. 1 in order to cope with the desire to increase the communication distance and the number of users in the PON with increasing the communication speed of an optical access network. In the example illustrated in FIG. 2, an optical repeater (an optical repeating device) 105 which is configured by using an optical amplifier or the like is interposed and connected between two sections of an optical fiber 102 that connects the OLT 101 with the optical splitter 103. In the above mentioned configuration, the optical repeater 105 which uses an active component is positioned on an intermediate part of a communication path. Thus, it is desirable for an optical communication network of the above mentioned type to have a function of performing supervisory control on the optical repeater 105 in order to smoothly perform duties such as sending of a notification when a failure has occurred, periodic maintenance and others. It is presumed that the distance between the OLT 101 on the side of a communication server and each ONU 104 on the side of each user ranges, for example, from about 50 km to about 200 km. It is also presumed that the number of ONUs 104 ranges from about 128 to about 256.

Figure 3:
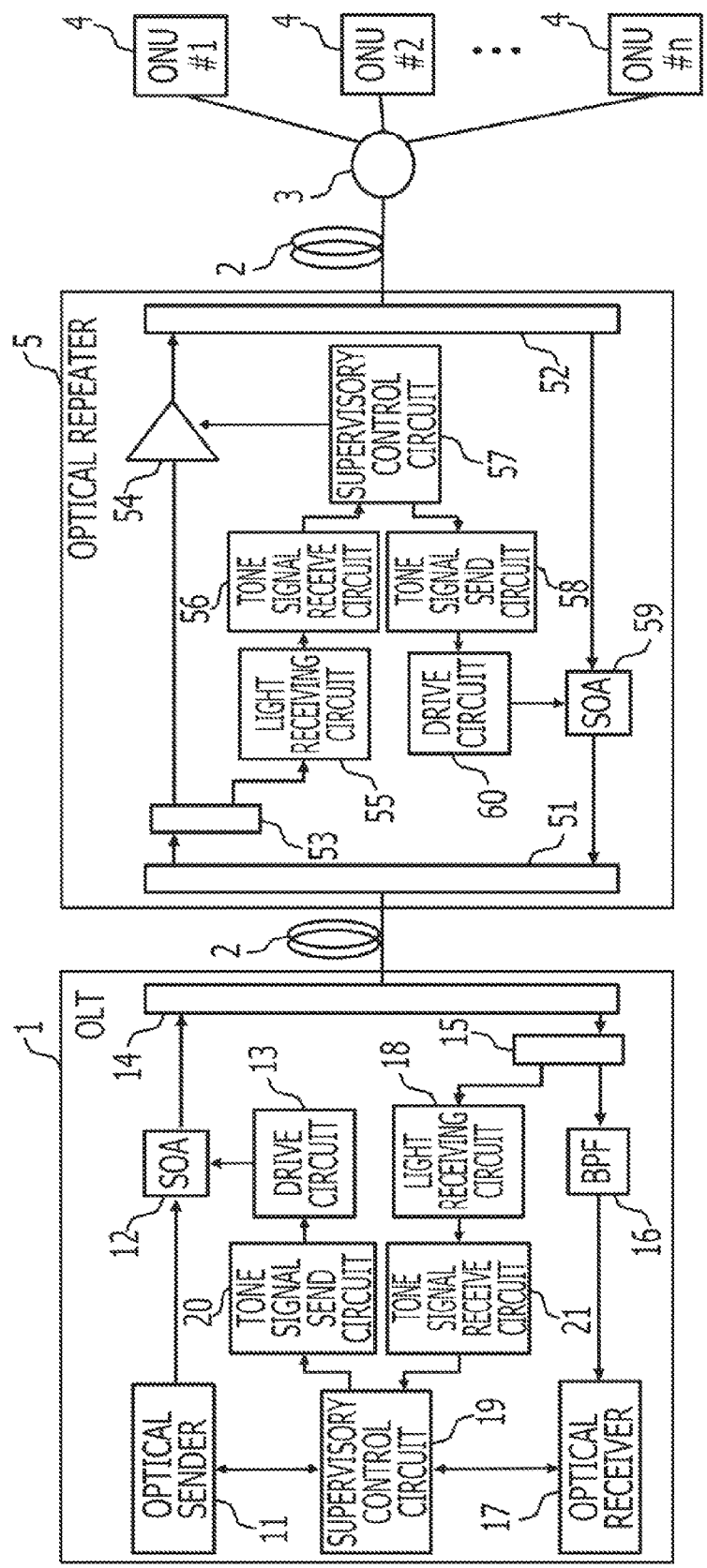
FIG. 3 is a diagram illustrating an example of a configuration of an optical communication network according to an embodiment.

FIG. 3 is a block diagram illustrating an example of a configuration of an optical communication network according to an embodiment.

In the example illustrated in FIG. 3, the optical communication network according to the above mentioned embodiment includes, for example, an OLT 1 which is installed on the side of a communication server concerned, a plurality of user-side ONUs 4 which are connected with the OLT 1 via an optical fiber 2 and an optical splitter 3, and an optical repeater 5 which is interposed and connected between two sections of an optical fiber 2 which is positioned between the OLT 1 and the optical splitter 3 on the optical fiber 2.

The OLT 1 sends down signal light which has been generated by modulating light having a desired wavelength band in accordance with information which is delivered to each user onto the optical fiber 2 and receives rays of up signal light, each having a wavelength band different from that of the up signal light, which are sent from respective users in time division. In addition, the OLT 1 has functions of superimposing a tone signal (which will be referred to as a "supervisory control tone signal") which carries information used to perform supervisory control on the optical repeater 5 (supervisory control information) on down-direction light (light which directs downward) and sending the tone signal to each ONU 4, and extracting the supervisory control tone signal from received up-direction light (the light which directs upward) to identify the supervisory control information.

As a specific example of a configuration, the above mentioned OLT 1 includes an optical sender 11, a semiconductor optical amplifier (SOA) 12, a drive circuit 13, a WDM (Wavelength Division Multiplexing) coupler 14, an optical splitter 15, a band pass filter (BPF) 16, an optical receiver 17, a light receiving circuit 18, a supervisory control circuit 19, a tone signal send circuit 20 and a tone signal receive circuit 21.

The optical sender 11 generates down signal light to be sent to each user and outputs the generated down signal light to the SOA 12. The SOA 12 has an amplification bandwidth including the wavelength band of the down signal light which is sent from the optical sender 11 and amplifies and outputs the down signal light in accordance with a drive current which is output from the drive circuit 13. In the above mentioned case, the drive current on which the supervisory control tone signal output from the tone signal send circuit 20 is superimposed is supplied from the drive circuit 13 to the SOA 12. Owing to the above mentioned operation, the supervisory control information is sent to the optical repeater 5 by utilizing ASE light (noise light) which is generated from the SOA 12, regardless of whether down signal light which is input into the SOA 12 is present.

The WDM coupler 14 sends the down signal light which is output from the SOA 12 to the optical fiber 2 and sends up signal light which has been transmitted through the optical fiber 2 in a direction opposite to a traveling direction of the down signal light to the optical splitter 15. The optical splitter 15 splits the up signal light sent from the WDM coupler 14 into two branch light rays in accordance with a desired branch ratio and sends one branch light ray to the BPF 16 and another branch light ray to the light receiving circuit 18. The BPF 16 extracts only a component having a wavelength band corresponding to the wavelength band of the signal light on which send information from each user is carried from the up signal light sent from the optical splitter 15 and outputs the extracted component to the optical receiver 17. The optical receiver 17 performs a receiving process on the output signal light from the BPF 16 to regenerate the send information from each user. The light receiving circuit 18 converts the up branch light ray which has been sent from the optical splitter 15 to an electric signal and outputs the electric signal to the tone signal receive circuit 21. The up branch light which is subjected to photoelectric conversion using the light receiving circuit 18 includes the signal light sent from each user and ASE light (noise light) generated from an SOA 59 of the optical repeater 5 which will be described later and the level of the electric signal obtained after photoelectric conversion is changed in accordance with the total power of the above up branch light ray.

The supervisory control circuit 19 judges the operational status of the above mentioned optical communication network on the basis of an instruction which is given in relation to the operation of the network, a state in which down signal light is sent using the optical sender 11, a state in which up signal light is received using the optical receiver 17 and the like and sends the tone signal send circuit 20 information used for supervisory control of the optical repeater 5 in accordance with a result of judgment. The tone signal send circuit 20 generates a supervisory control tone signal having a frequency which is sufficiently lower than the modulation frequency of the down signal light in accordance with the supervisory control information sent from the supervisory control circuit 19 and outputs the generated tone signal to the drive circuit 13. The tone signal receive circuit 21 performs synchronous detection corresponding to the frequency of the supervisory control tone signal (to detect whether a signal component having the frequency corresponding to that of the supervisory control tone signal is present) on the electric signal which is output from the light receiving circuit 18 to extract the supervisory control tone signal from the electric signal, identifies the supervisory control information sent from the optical repeater 5 on the basis of the extracted supervisory control tone signal and sends the supervisory control circuit 19 a result of identification. The supervisory control circuit 19 appropriately updates the supervisory control information to be sent to the tone signal send circuit 20 in accordance with the result of identification sent from the tone signal receive circuit 21. Incidentally, the supervisory control circuit 19 may perform supervisory control in relation to sending of a notification when a failure has occurred, maintenance and the like.

The optical repeater 5 compensates for losses which are generated in the optical fiber 2 and the optical splitter 3 by amplifying the up signal light and the down signal light which are transmitted mutually in different directions through the optical fiber 2 between the OLT 1 and the optical splitter 3 as they are without converting to electric signals using corresponding optical amplifiers. Owing to the operation of the optical repeater 5, it may become possible to cope with the desire to increase a transmission distance and the number of users (the number of branch light rays obtained using the optical splitter 3) with increasing the communication speed of the optical access network at a low cost. In addition, the optical repeater 5 sends the supervisory control information to the OLT 1 and receives the information from the OLT 1 by utilizing the ASE light which is generated using the SOA, thereby performing supervisory control in accordance with the operational status of the network.

As a specific example of a configuration, the optical repeater 5 includes WDM couplers 51 and 52, an optical splitter 53, an optical amplifier 54, a light receiving circuit 55, a tone signal receive circuit 56, a supervisory control circuit 57, a tone signal send circuit 58, the SOA 59 and a drive circuit 60. The light deceiving circuit 55, the tone signal receive circuit 56, the supervisory control circuit 57, the tone signal send circuit 58 and the drive circuit 60 may be configured using at least one FPGA (field-programmable gate array) and/or at least one DSP (digital signal processor).

The WDM couple 51 receives down signal light which has been sent from the OLT 1 and propagated through the optical fiber 2 and sends the received down signal light to the optical splitter 53, and sends up signal light which has been amplified using the SOA 59 onto the optical fiber 2 on the side of the OLT 1. The optical splitter 53 splits the down signal light which has been sent from the WDM coupler 51 into two branch light rays in accordance with a desired branch ratio and sends one branch light ray to the optical amplifier 54 and another branch light ray to the light receiving circuit 55.

The optical amplifier 54 amplifies the amplitude of the down signal light (the branch light ray) sent from the optical splitter 53 to a desired level and outputs the down signal light so amplified to the WDM coupler 52. The above mentioned operation of the optical amplifier 54 is controlled in accordance with a signal which is output from the supervisory control circuit 57. The WDM coupler 52 sends the down signal light so amplified using the optical amplifier 54 onto the optical fiber 2 on the side of the optical splitter 3. The WDM coupler 52 also receives up signal light (an optical burst signal) which has been sent from the ONU 4 of each user and propagated through the optical fiber 2 via the optical splitter 3 and sends the received up signal light to the SOA 59.

The light receiving circuit 55 converts the down light (the branch light ray) sent from the optical splitter 53 to an electric signal and outputs the electric signal so converted to the tone signal receive circuit 56. The down light which is subjected to photoelectric conversion using the light deceiving circuit 55 includes the signal light which is generated using the optical sender 11 of the OLT 1 and the ASE light which is generated from the SOA 12 and the level of the electric signal obtained after photoelectric conversion is changed in accordance with the total power of the down light. The tone signal receive circuit 56 performs synchronous detection corresponding to the frequency of the supervisory control tone signal on the electric signal which is output from the light receiving circuit 55 to extract the supervisory control tone signal from the electric signal, identifies the supervisory control information sent from the OLT 1 on the basis of the extracted supervisory control tone signal and sends the supervisory control circuit 57 a result of identification. The supervisory control circuit 57 controls the optical amplifying operation performed using the optical amplifier 54 and the SOA 59 in accordance with the result of identification sent from the tone signal receive circuit 56 and generates supervisory control information used to receive a response to the supervisory control information from the OLT 1 and to notify the OLT 1 of the operating state of the optical repeater 5 and sends the tone signal send circuit 58 the generated supervisory control information.

The tone signal send circuit 58 generates a supervisory tone signal having a frequency which is sufficiently lower than the modulation frequency of the light which is sent from each user and is included in the up signal light and outputs the generated tone signal to the drive circuit 60 of the SOA 59. The SOA 59 has an amplitude band width including the wavelength band of the up signal light sent from the WDM coupler 52, and amplifies the up signal light in accordance with a drive current which is output from the drive circuit 60 and outputs the up signal light so amplified. In the above mentioned case, the drive current on which the supervisory control tone signal which is output from the tone signal send circuit 58 is superimposed is supplied from the drive circuit 60 to the SOA 59, so that the supervisory control information is sent to the OLT 1 by utilizing the ASE light (the noise light) which is generated from the SOA 59, regardless of the form (for example, the optical burst signal or the like) of the up signal light which is input into the SOA 59. For example, the supervisory control information may be transmitted by utilizing the ASE light even in a state in which communication using the optical bust signal as the up signal light is not performed.

The optical splitter 3 splits the down signal light which has been output from the optical repeater 5 and propagated through the optical fiber 2 into a plurality of branch light rays of the number corresponding to the number of users concerned and sends the respective branch light rays to the respective users, and units rays of signal light which are sent from the respective ONUs 4 in time division into one up signal light (one optical burst signal) and outputs the up signal light onto the optical fiber 2 on the side of the optical repeater 5.

Each ONU 4 receives each down signal light (each branch light ray) obtained by splitting the down signal light using the optical splitter 3 and performs an identifying process on information which has been sent from the OLT 1 thereto. In addition, each ONU 4 modulates the wavelength of a light having a wavelength band which is different from that of the down signal light in accordance with information which is sent to the OLT 1 and sends signal light which has been obtained as a result of modulation at a predetermined timing which is allocated to each ONU.

Figure 4:
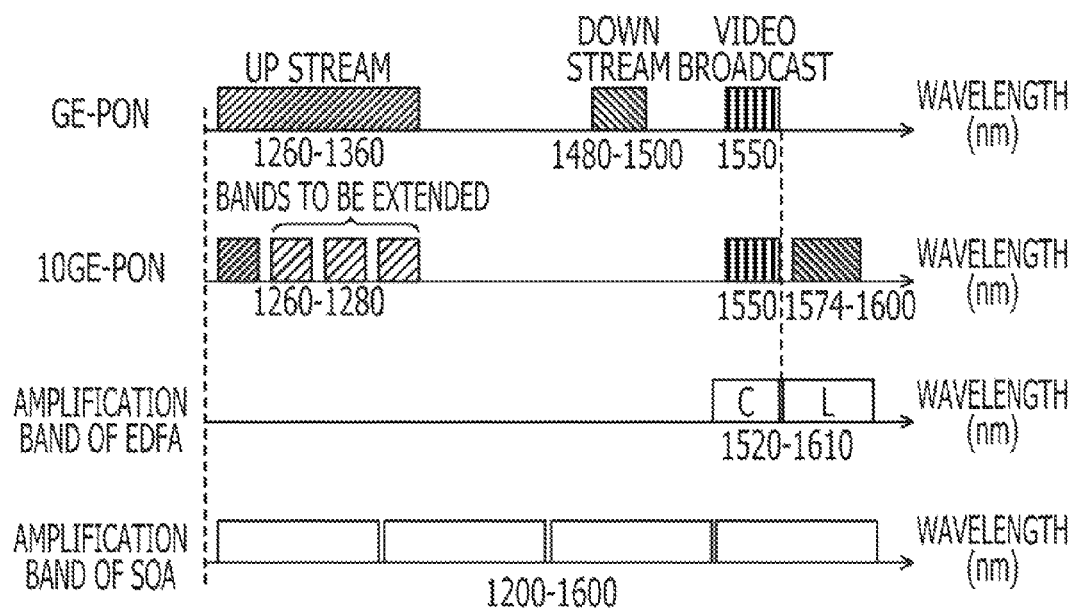
FIG. 4 is a diagram illustrating examples of signal light wavelength bands which are set in GE-PON and 10GE-PON.

Next, wavelength bands of up signal light and down signal light which are transmitted on the above mentioned optical communication network will be described. FIG. 4 is a diagram illustrating setting examples of the wavelength bands of the up signal light and the down signal light in the GE-PON and the 10 GE-PON.

In the GE-PON which is illustrated as the first example in FIG. 4 and on which up signal light and down signal light are transmitted at a communication speed of 1 Gbps, as the wavelength band of the up signal light (UP_STREAM) which is sent from each ONU on the user side to the OLT on the side of the communication server, a band ranging from 1260 to 1360 nm is set. In addition, as the wavelength band of the down signal light (DOWN_STREAM) which is sent from the OLT to each ONU, a band ranging from 1480 to 1500 nm is set and as the wavelength band of a video signal light (VIDEO_BROADCAST) which is sent (broadcasted) from the OLT to an arbitrary ONU, a band of values around 1550 nm is set. As illustrated in the example in FIG. 1, in the existing GE-PON, a communication path of a relatively short distance (for example, ranging from about 10 to about 20 km) for connecting the communication server with each user is configured using only the passive component. Thus, it is permitted to set the wavelength bands of the up signal light and the down signal light by selecting wavelength ranges within which the transmission loss is relatively little in the communication path.

On the other hand, in the 10GE-PON which is illustrated as the second example in FIG. 4 and on which up signal light and down signal light are transmitted at a communication speed of 10 Gbps, as the wavelength band of the up signal light (UP_STREAM), a band ranging from 1260 to 1280 nm is set. Incidentally, in the vicinity of the longer wavelength side in the above mentioned wavelength band, a wavelength band which will be used to cope with future expansion of the up signal light is prearranged. In addition, as the wavelength band of the down signal light (DOWN_STREAM) which is sent from the OLT to each ONU, a band ranging from 1574 to 1600 nm is set and as the wavelength band of video signal light (VIDEO_BROADCAST) which is sent (broadcasted) from the OLT to an arbitrary ONU, a band of values around 1550 nm is set. As illustrated in the example in FIG. 2, in the 10GE-PON which is higher in communication speed than the GE-PON, it is expected to install an optical repeater on the communication path in order to cope with the desire to increase the transmission distance and the number of branch light rays of light which is split using the optical splitter 3. In the above mentioned case, it may be desirable to set the wavelength bands of the up signal light and the down signal light by taking both the transmission loss of the communication path and the amplification wavelength band of the optical amplifier used in the optical repeater into consideration.

In the case that, for example, a general EDFA is used as the optical amplifier to be used in the above mentioned optical repeater, the amplification wavelength band of the EDFA is in a wavelength range from 1520 to 1610 nm covering C-band and L-band as illustrated in the third example in FIG. 4. Thus, it may be difficult to amplify the amplitude of the up signal light which is set in a wavelength band of around 1300 nm using the general EDFA. As an existing optical amplifier which may amplify the wavelength band of the above mentioned up signal light, for example, an optical amplifier using a praseodymium (Pr) doped fiber (Praseodymium Doped Fiber Amplifier: PDFA) is proposed. However, the PDFA is expensive and hence application of the PDFA to an optical access network that aims at cost reduction may not be practical.

Under the above mentioned circumstances, in the embodiment, application of a semiconductor optical amplifier (SOA) which may set an amplification band width in a wavelength range from 1200 to 1600 nm that covers the wavelength bands of both of the up signal light and the down signal light as illustrated in the fourth example in FIG. 4 and which may be realized at a low cost will be considered. The amplification band width of one chip of SOA is in a range from about 50 to about 80 nm, so that a plurality of SOAs are combined with one another in accordance with each of the wavelength bands of the up signal light and the down signal light. The SOA is preferably used as the optical amplifier in the optical access network from the viewpoints of the amplification band width and the cost involved and may make it possible to realize transmission of supervisory control information which is performed regardless of the form of the signal light which is input into the SOA by utilizing input/output characteristics obtained by taking the ASE light which is generated in optical amplification into consideration.

Figure 5:
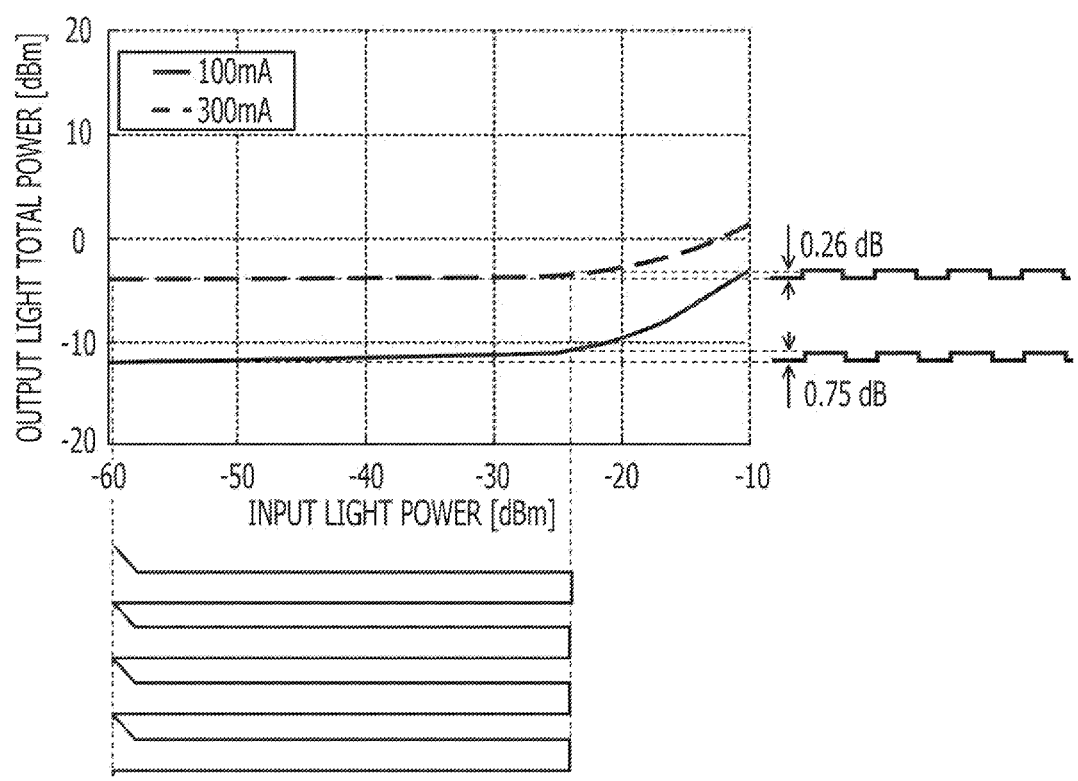
FIG. 5 is a diagram illustrating an example of a result of measurement of input/output characteristics of an SOA (Semiconductor Optical Amplifier)

FIG. 5 is a graph illustrating an example of a result of measurement of values of relations of the output light power to the input light power in the SOA which is performed by changing the magnitude of the drive current.

In the example illustrated in FIG. 5, a solid line illustrated on an upper left part of the graph indicates a relation of the output light power to the input light power obtained in the case that the drive current of the SOA has been fixed to 100 mA and a broken line indicates a relation of the output light power to the input light power obtained in the case that the drive current of the SOA has been fixed to 300 mA. In the case that an optical burst signal which repeats ON and OFF states periodically in a range from −60 to −25 dBm as illustrated on a lower left part in FIG. 5 is input into the SOA having input/output characteristics as mentioned above, the total power of light including signal light which is output from the SOA and ASE light is changed in a state in which a difference in light level between the ON and OFF states is reduced as illustrated on an upper right part in FIG. 5.

Specifically, in a state in which the drive current of 300 mA is supplied to the SOA, in the case that the power of the input light into the SOA is changed in the range from −60 dBm to −25 dBm, the changing amount of the total power of the output light from the SOA is reduced to about 0.26 dB. It may be said that the total power of the output light is hardly changed as compared with a change in the power of the input light. When the drive current which is supplied to the SOA is reduced from 300 mA to 100 mA, the average level of the total power of the output light is reduced in accordance with a reduction of the drive current. However, as long as the power of the input light is changed within the range from −60 dBm to −25 dBm, the total power of the output light is changed by about 0.75 dB, that is, the total power of the output light is hardly changed as compared with a change in the power of the input light as in the case with the drive current of 300 mA.

That is, in the case that the power of the input light into the SOA is changed within a range of levels which are lower than a desirable level (−25 dBm in the example illustrated in FIG. 5), the total power of the light which includes the signal light and the ASE light and is output from the SOA is not substantially changed depending on the change in the power of the input light and only the average level of the total power of the output light is changed in accordance with the magnitude of the drive current supplied to the SOA. Incidentally, it may be desirable to consider such a point that that the total power of the output light from the SOA includes the power of a light component having a wavelength band corresponding to that the signal light which is input into the SOA and also includes the power of light of all the wavelength bands which is output from the SOA, that is, power of all rays of ASE light which are generated in optical amplification.

As described above, the SOA has such input/output characteristics that on condition that the power of the input light is lower that a desirable level, the total power of the output light is changed substantially independently of the change in the power of the input light and in accordance with the magnitude of the drive current supplied to the SOA. It may become possible to perform intensity modulation on the output light from the SOA by modulating the drive current supplied to the SOA by utilizing the above mentioned characteristics, regardless of whether signal light which is input into the SOA is present and the form of the signal which is input into the SOA. Therefore, it may become possible to perform supervisory control on the optical repeater 5 which is disposed on the communication path by superimposing a feeble and low-frequency supervisory control tone signal on the drive current to be supplied to the SOA, performing synchronous detection on the sink side to extract the supervisory control tone signal included in the output light from the SOA and identifying the supervisory control information on the basis of the extracted supervisory control tone signal, without preparing a light source for supervisory control in addition to a light source for a signal.

Next, the operating condition of the SOA under which the total power of the output light from the SOA is substantially independent of the power of the input light (in the example illustrated in FIG. 5, the power of the input light is changed within a range of levels lower than −25 dBm) will be described in detail.

First, it is assumed that the power of the input light into the SOA is X [mW] and the total power of the output light is Y[mW]. In addition, it is also assumed that the power of the ASE light which is generated when the drive current of a certain magnitude is supplied to the SOA is K[mW] and the gain of the SOA is G (an anti-logarithm). If the drive current is substantially constant, the ASE light power K and the gain G will be constant values. In the above mentioned case, the relation of the output light total power Y to the input light power X may be expressed by the following formula (1):

$$Y = X \cdot G + K \quad (1)$$

Figure 6:
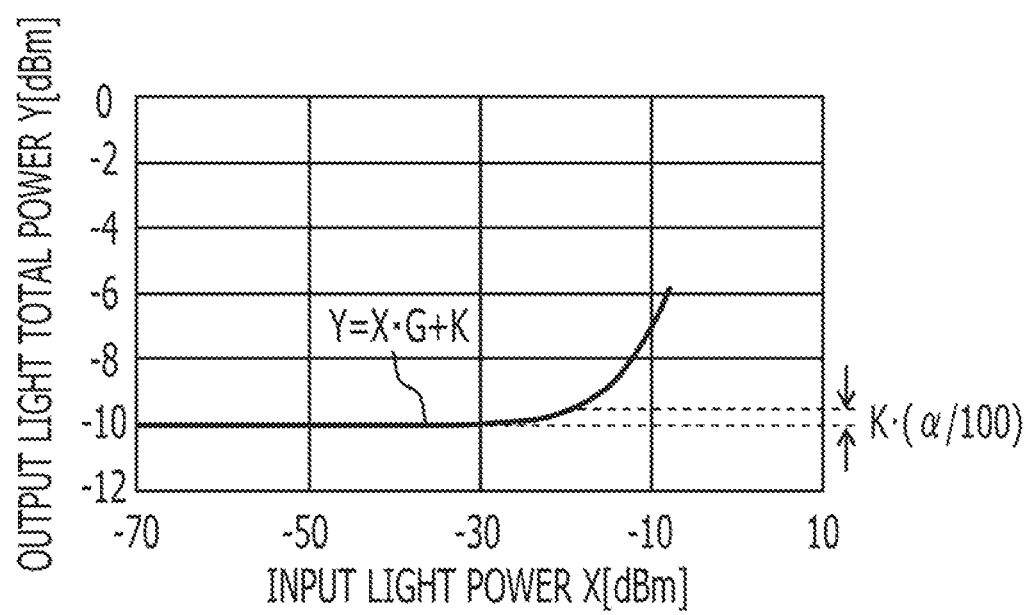
FIG. 6 is a diagram illustrating an example of a graph for explaining a numerical formula expressing the input/output characteristics of the SOA.

The graph illustrated in FIG. 6 indicates the relation in the above formula (1) in the form of a common logarithm. In the case that the input light power X is sufficiently lower than the ASE light power K (X<<K), the relation in the formula (1) may be approximated to Y=K. In the example illustrated in FIG. 6, such a relation that Y=K=−10 [dBm]=0.1 [mW] is established. Then, as the input light power X is gradually increased, the output light total power Y is varied accordingly. The amount by which the output light total power Y is varied with increasing the input light power X is expressed by X·G.

In the above mentioned situation, assuming that the total power of the output light from the SOA is permitted to be varied up to α[%] in order to realize transmission of supervisory control information utilizing the SOA, the relation expressed by the following formulae (2) is established with respect to the tolerance of the input light power X.

$$X \cdot G \leq K \cdot (\alpha/100)$$

$$X \leq (K \cdot \alpha)/(100 \cdot G) \quad (2)$$

A specific example of the relation in the above formula (2) is as follows. Assuming that the gain G of the SOA to which a specific drive current is supplied is one time, the ASE light power K is 0.1 mW (−10 dBm) and the allowable variation amount a of the output light total power is 5% (the amount with which a −10 dBm output power is varied by 0.22 dB), the tolerance of the input light power will be X≤0.005 [mW]. That is, under a condition that the power of the input light into the SOA is changed within a range of levels lower than −23 dBm, the total power of the output light from the SOA comes to be changed substantially independently of the input light power and it may become possible to realize transmission of the supervisory control information utilizing the SOA.

If the power of the input light into the SOA 59 in the optical repeater 5 in the example of the above mentioned embodiment (FIG. 3) is calculated on the basis of the level at which the up signal light is received using the OLT, for example, in a 10GE-PON standardization of which is being promoted in IEEE802.3av in relation to the tolerance of the power of input light into an SOA as described above, a range from about −30 to about −25 dBm may be expected. The above mentioned range of the input light power is included in the range (−60 to −25 dBm) of the input light power within which the output light total power is hardly changed with a change in the power of the input light in the input/output characteristics of the SOA illustrated in FIGS. 5 and 6. Therefore, it may be possible to apply a system of transmitting supervisory control information utilizing the SOA according to the above mentioned embodiment to the 10GE-PON.

Next, examples of operations of the above mentioned embodiment will be described.

In an optical communication network which is configured in the above mentioned manner, down signal light and video signal light are sent from the OLT 1 on the side of the communication server to each ONU 4 on the user side and up signal light (an optical burst signal) is sent from each ONU 4 to the OLT 1. The amplitude of each ray of signal light which is bi-directionally transmitted between the OLT 1 and each ONU 4 is amplified to a desired level as it is without being converted to an electric signal, using the optical repeater 5 which is interposed and connected between two sections of the optical fiber 2 for connecting OLT 1 with the optical splitter 3 so as to compensate for losses generated in the optical fiber 2 and the optical splitter 3. A light amplifying operation performed using the optical repeater 5 is supervisory-controlled by transmitting the supervisory control information between the OLT 1 and the optical repeater 5 by utilizing the ASE light generated from the SOA. Next, the operation of the optical communication network will be described in detail, in particular, in relation to the supervisory control performed on the optical repeater 5.

First, the operation of the OLT 1 will be described. The operational status of the optical communication network is judged on the basis of an instruction which is given in relation to the operation of the network, a state in which down signal light is sent from the optical sender 11, a state in which up signal light is received by the optical receiver 17 and the like using the supervisory control circuit 19. Then, information (that is, supervisory control information) used to perform supervisory control on the optical repeater 5 is generated in accordance with a result of judgment and the generated supervisory control information is sent to the tone signal send circuit 20. The tone signal send circuit 20 receives the supervisory control information from the supervisory control circuit 19, generates a supervisory control tone signal which has a frequency sufficiently lower than the modulation frequency of the down signal light and the amplitude of which is changed in accordance with the supervisory control information and outputs the generated tone signal to the drive circuit 13.

The drive circuit 13 generates a drive current obtained by superimposing the supervisory control tone signal sent from the tone signal send circuit 20 on a fixed current used to drive the SOA 12 at a desired gain and sends the drive current so generated to the SOA 12. The supervisory control tone signal is superimposed on the fixed current by changing the current value by a sufficiently small extent of current (for example, ±1 mA) in accordance with the supervisory control tone signal relative to the fixed current which is set, in general, within a range from 100 to 300 mA.

In the SOA 12 to which the above drive current has been supplied, the amplitude of the down signal light which is output from the optical sender 11 is amplified at a desired gain. In the above mentioned case, in the SOA 12, ASE light is generated in accordance with the drive current supplied to the SOA 12 regardless of whether the down signal light is input. The supervisory control tone signal is superimposed on the drive current, so that the power of the ASE light is slightly changed in accordance with the component so superimposed. In addition, if the operation of the optical sender 11 is set such that the power of the down signal light which is input into the SOA 12 is changed within a range in which the relation expressed by the above formulae (2) is met, the total power of the light (including the amplified down signal light and the ASE light) which is output from the SOA 12 will be changed in accordance with only the superimposed component (that is, the supervisory control tone signal), substantially regardless of the change in the power of the input light. The light output from the SOA 12 is sent onto the optical fiber 2 via the WDM coupler 14 and is transmitted to the optical repeater 5 through the optical fiber 2. Therefore, even when such a situation occurs that transmission of the down signal light is interrupted owing to occurrence of a failure or the like in the optical sender 11, the supervisory control information may be transmitted to the optical repeater 5 by utilizing the ASE light which is generated from the SOA 12.

In the optical repeater 5, the down signal light which has been sent from the OLT 1 and input into the WDM coupler 51 through the optical fiber 2 is split into two branch light rays using the optical splitter 53 and the two branch light rays are then respectively sent to the optical amplifier 54 and the light receiving circuit 55. In the optical amplifier 54, the amplitude of the down signal light (the branch light ray) which has been sent from the optical splitter 53 is amplified to a desired level. The amplified down signal light is sent onto the optical fiber 2 on the side of the optical splitter 3 via the WDM coupler 52, and then is further split into branch light rays of the number corresponding to the number of users concerned using the optical splitter 3 to be transmitted to the ONUs 4 of the respective users.

In the light receiving circuit 55 of the optical repeater 5, the down signal light which has been split using the optical splitter 53 is converted to an electric signal and is output to the tone signal receive circuit 56. In the tone signal receiver circuit 56, synchronous detection corresponding to the frequency of the supervisory control tone signal is performed on the electric signal sent from the light receiving circuit 5. Then, an identifying process is performed on the basis of the supervisory control tone signal which has been extracted in the above mentioned synchronous detection and a result of the identifying process performed is sent from the tone signal receive circuit 56 to the supervisory control circuit 57. In the supervisory control circuit 57, the optical amplifying operation performed using the optical amplifier 54 and the SOA 59 is controlled in accordance with the result of identifying process performed using the tone signal receive circuit 56, that is, the supervisory control information transmitted from the OLT 1. Substantially at the same time as the above mentioned operation, supervisory control information used to receive a response to the supervisory control information made from the OLT 1 and to notify the OLT 1 of the operating state of the optical repeater 5 is generated and is sent from the supervisory control circuit 57 to the tone signal send circuit 58. The tone signal send circuit 58 which has received the supervisory control information from the supervisory control circuit 57 generates a supervisory control tone signal which has a frequency sufficiently lower than the modulation frequency of the light which is included in the up signal light and is sent from each user and the amplitude of which is changed in accordance with the supervisory control information and outputs the generated tone signal to the drive circuit 60.

In the drive circuit 60, a drive current obtained by superimposing the supervisory control tone signal sent from the tone signal send circuit 58 on a fixed drive current used to drive the SOA 59 at a desired gain is generated and sent to the SOA 59. The supervisory control tone signal may be superimposed on the fixed drive current by changing the current value by a sufficiently small extent of current (for example, ±1 mA) in accordance with the supervisory control tone signal relative to the drive current which is fixed in a range from about 100 to about 300 mA as in the case in the drive circuit 13 of the above mentioned OLT 1.

In the SOA 59 to which the above drive current has been supplied, the amplitude of up signal light which is output from the ONU 4 of each user, reaches the optical repeater 5 via the optical splitter 3 and the optical fiber 2 and is input into the SOA 59 via the WDM coupler 52 is amplified at a desired gain. In the above mentioned case, the up signal light which is input into the SOA 59 is in the form of an optical burst signal in which rays of signal light which are sent from the respective users in time division are intermittently disposed. However, the SOA 59 generates ASE light in accordance with the drive current, regardless of the state of the up signal light which is input with the rays of signal light from the respective users disposed intermittently. The supervisory control tone signal is superimposed on the drive current, so that the power of the ASE light is slightly changed in accordance with the superimposed component. In addition, the power of the up signal light which is input into the SOA 59 is attenuated while it is being propagated through the optical fiber 2 or the like after it has been sent from each ONU 4 and the power of the up signal light is changed within a range in which the relation expressed by the above formulae (2) is met. Thus, the total power of the light (including the amplified up signal light and the ASE light) which is output from the SOA 59 comes to be changed in accordance with only the supervisory control tone signal, regardless of a change in the power of the input light. The output light from the SOA 59 is sent onto the optical fiber 2 on the side of the OLT 1 via the WDM coupler 51 and is propagated through the optical fiber 2 to the OLT 1. Therefore, even when the up signal light which is subjected to optical amplification using the optical repeater 5 is in the form of an intermittent optical burst signal, the supervisory control information may be transmitted to the OLT 1 by utilizing the ASE light which is generated from the SOA 59.

An up signal light receiving operation performed using the OLT 1 will be described. The up signal light which is output from the optical repeater 5 and is input into the WDM coupler 14 through the optical fiber 2 is split using the optical splitter into two branch light rays and the branch light rays are respectively sent to the BPF 16 and the light receiving circuit 18. In the BPF 16, only a signal component of a wavelength band corresponding to that (for example, a wavelength band ranging from 1260 to 1280 nm, when the 10GE-PON illustrated in FIG. 4 is used) of the signal light which is sent from each user is extracted from the up signal light (the branch light ray)

which is sent from the optical splitter 15 and is output to the optical receive circuit 17. By removing the ASE light component included in the up signal light using the BPF 16, the signal-to-noise ratio (OSNR) of the signal light which is sent to the optical receiver 17 is increased. The optical receiver 17 performs a receiving process on the signal light which is output from the BPF 16 to regenerate send information from each user.

In the light receiving circuit 18, the up light which has been split using the optical splitter 15 is converted to an electric signal and is output to the tone signal receive circuit 21. Incidentally, it may be unnecessary to install an optical filter such as the BPF 16 at the front stage the light receiving circuit 18. Because, as described above, the supervisory control tone signal is superimposed on the drive current relative to the total power of the light which is output from the SOA 59 and includes the up signal light and the ASE light and the component which is modulated with the supervisory control tone signal is also included in the ASE light component of the wavelength band other than the wavelength band of the up signal light. Therefore, in the light receiving circuit 18, rays of light of all the wavelength bands which are output from the optical splitter 15 are converted to electric signals.

In the tone signal receive circuit 21, synchronous detection corresponding to the supervisory control tone signal is performed on each electric signal sent from the light receiving circuit 18. Then, an identifying process is performed on the basis of each supervisory control tone signal which has been extracted in the above mentioned synchronous detection and a result of the identifying process performed is sent from the tone signal receive circuit 21 to the supervisory control circuit 19. In the supervisory control circuit 19, the operating state of the optical repeater is judged in accordance with the result of the identifying process performed using the tone signal receive circuit 21, that is, the supervisory control information transmitted from the optical repeater 5 and supervisory control information to be sent to the tone signal send circuit 20 is updated on the basis of a result of judgment.

It may become possible to realize supervisory control of the optical repeater 5 at a low cost regardless of whether the signal light to be input into each of the SOAs 12 and 59 is present and the form of the signal which is input into each SOA, by transmitting the supervisory control information between the OLT 1 and the optical repeater 5 in the above mentioned manner by utilizing the ASE light from each of the SOAs 12 and 59.

Next, the principle that the supervisory control information is transmitted utilizing the ASE light from each SOA regardless of whether the signal light to be input into each SOA is present and the form of the signal which is input into each SOA will be described in detail with reference to FIGS. 7 to 12.

Figure 7A:
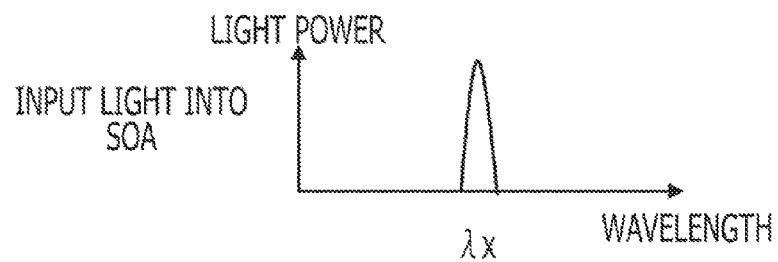
FIG. 7A is a diagram illustrating an example of an optical spectrum observed on each part when light which is input into the SOA is continuous light.
Figure 7B:
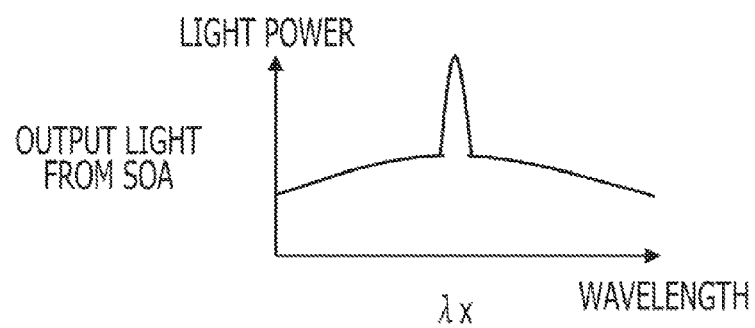
FIG. 7B is a diagram illustrating an example of an optical spectrum observed on each part when light which is input into the SOA is continuous light.
Figure 7C:
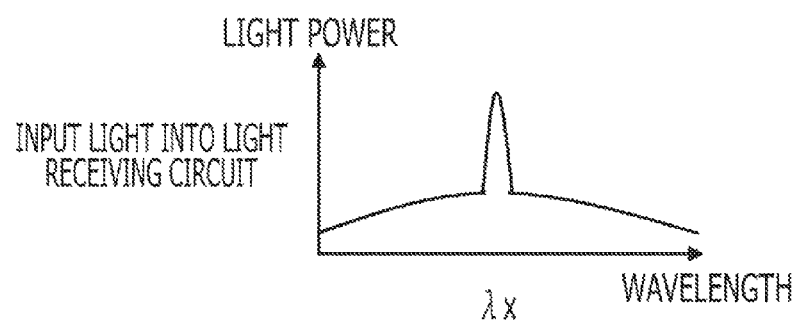
FIG. 7C is a diagram illustrating an example of an optical spectrum observed on each part when light which is input into the SOA is continuous light.
Figure 7D:
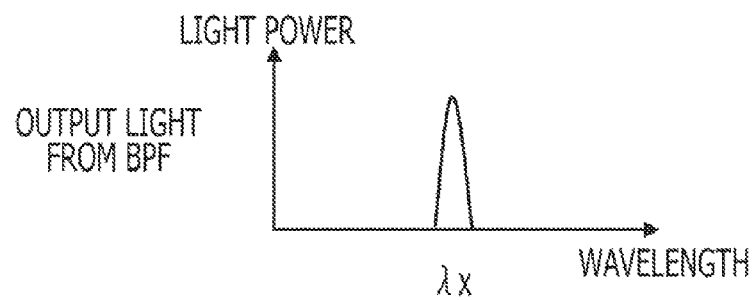
FIG. 7D is a diagram illustrating an example of an optical spectrum observed on each part when light which is input into the SOA is continuous light.
Figure 8A:
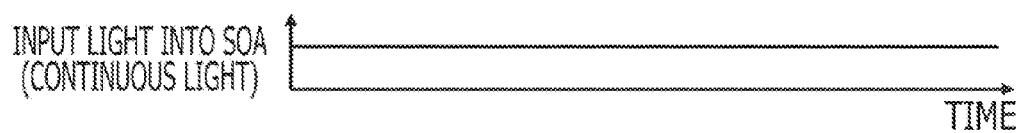
FIG. 8A is a diagram illustrating an example of a signal waveform observed on each part when light which is input into the SOA is continuous light.
Figure 8B:
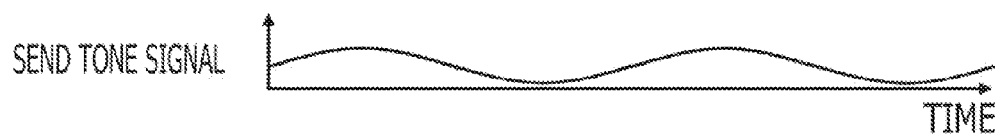
FIG. 8B is a diagram illustrating an example of a signal waveform observed on each part when light which is input into the SOA is continuous light.
Figure 8C:
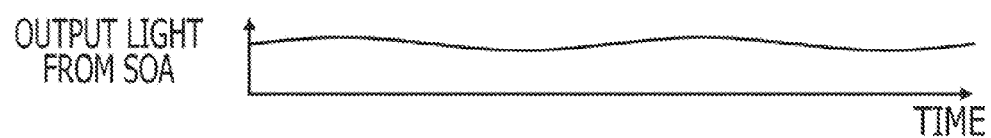
FIG. 8C is a diagram illustrating an example of a signal waveform observed on each part when light which is input into the SOA is continuous light.
Figure 8D:
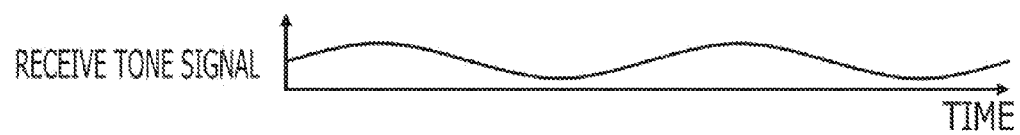
FIG. 8D is a diagram illustrating an example of a signal waveform observed on each part when light which is input into the SOA is continuous light.

First, a case in which the input light into the SOA is signal light which has been modulated by a desired light modulation system and is continuous in time (in some cases, referred to as "continuous light" when compared with an optical burst signal) will be considered. In the above mentioned case, as illustrated in the examples in FIGS. 7A and 8A, only signal light which has a peak at a certain wavelength $\lambda x$ is continuously input into the SOA. A low-frequency supervisory control signal as illustrated in the example in FIG. 8B is superimposed on the drive (current) signal supplied to the SOA. Therefore, light in which wide-band ASE light is added to signal light obtained by amplifying the input light having the peak at the wavelength $\lambda x$ is output from the SOA as illustrated in the example in FIG. 7B. As illustrated in the example in FIG. 8C, the output light from the SOA is slightly modulated corresponding to the frequency of the supervisory control tone signal. The light which is output from the SOA in the above mentioned form is transmitted (sent and received) between the OLT and the optical repeater via the optical fiber. As a result, light including the signal light having the wavelength $\lambda x$ and a wide-band ASE light as illustrated in the example in FIG. 7C is input into the light receiving circuit on the sink side. Then, synchronous detection corresponding to the supervisory control tone signal is performed using the tone signal receive circuit to extract the supervisory control tone signal which is the same as that obtained when the signal light is sent, thereby obtaining the supervisory control information as illustrated in the example in FIG. 8D. Incidentally, in receiving the signal light having the wavelength $\lambda x$, the OSNR may be increased by removing an ASE light component of a frequency band other than the frequency band of the signal light using the BPF as illustrated in the example in FIG. 7D.

Figure 9A:
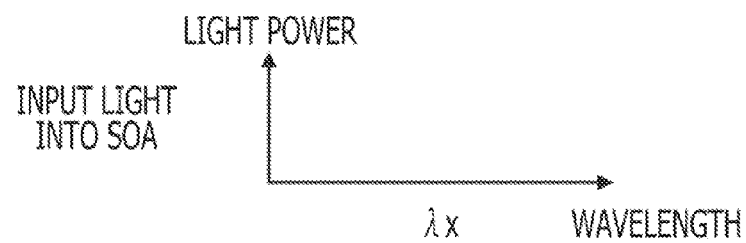
FIG. 9A is a diagram illustrating an example of an optical spectrum observed on each part when light which is input into the SOA is not present.
Figure 9B:
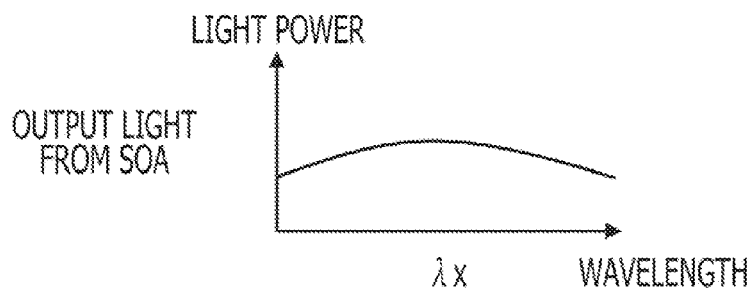
FIG. 9B is a diagram illustrating an example of an optical spectrum observed on each part when light which is input into the SOA is not present.
Figure 9C:
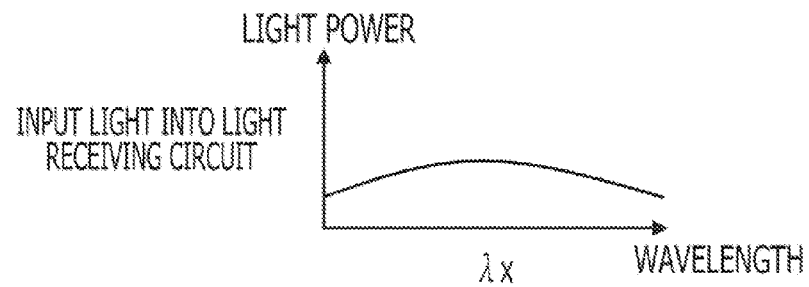
FIG. 9C is a diagram illustrating an example of an optical spectrum observed on each part when light which is input into the SOA is not present.
Figure 9D:
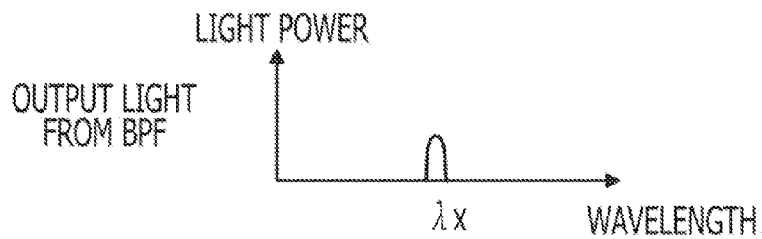
FIG. 9D is a diagram illustrating an example of an optical spectrum observed on each part when light which is input into the SOA is not present.
Figure 10A:
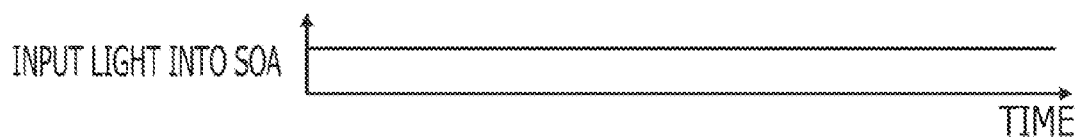
FIG. 10A is a diagram illustrating an example of a signal waveform observed on each part when light which is input into the SOA is not present.
Figure 10B:
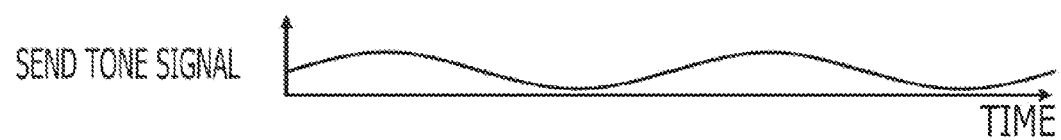
FIG. 10B is a diagram illustrating an example of a signal waveform observed on each part when light which is input into the SOA is not present.
Figure 10C:
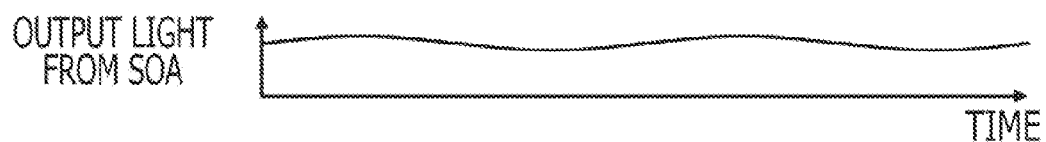
FIG. 10C is a diagram illustrating an example of a signal waveform observed on each part when light which is input into the SOA is not present.
Figure 10D:
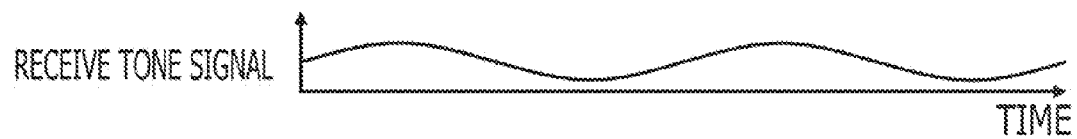
FIG. 10D is a diagram illustrating an example of a signal waveform observed on each part when light which is input into the SOA is not present.

Next, a case in which light which is input into the SOA is not present will be considered. In the above mentioned case, as illustrated in the examples in FIGS. 9A and 10A, the power of light which is input into the SOA is maintained zero continuously. However, a low-frequency supervisory control tone signal as illustrated in the example in FIG. 10B is superimposed on the drive current supplied to the SOA as in the case in the above mentioned continuous light. Therefore, wide-band ASE light is output from the SOA as illustrated in the example in FIG. 9B and the total power of the output light is slightly modulated corresponding to the supervisory control tone signal as illustrated in the example in FIG. 10C. Therefore, wide-band ASE light as illustrated in the example in FIG. 9C is input into the light receiving circuit on the sink side. Then, synchronous detection corresponding to the supervisory control tone signal is performed using the tone signal receive circuit to extract the supervisory control tone signal which is the same as that obtained when the signal light is sent, thereby obtaining the supervisory control information as illustrated in the example in FIG. 10D. Incidentally, if the light which is input into the SOA on the source side is not present, only the ASE light of a wavelength band which is within the wavelength band of the signal light will be output from the BPF on the sink side as illustrated in the example in FIG. 9D.

Figure 11A:
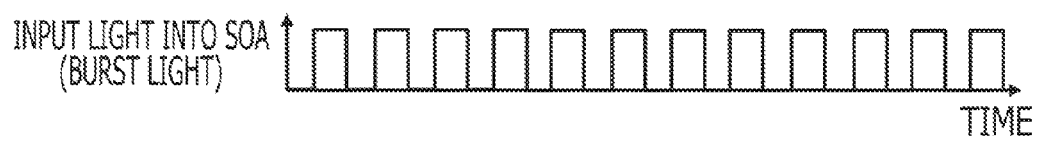
FIG. 11A is a diagram illustrating an example of a signal waveform observed on each part when light which is input into the SOA is in the form of an optical burst signal.
Figure 11B:
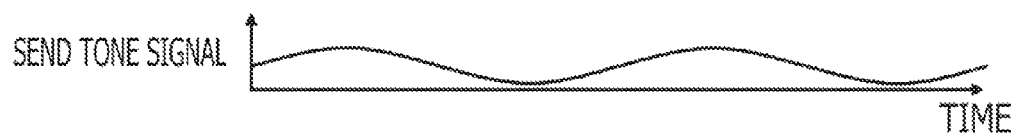
FIG. 11B is a diagram illustrating an example of a signal waveform observed on each part when light which is input into the SOA is in the form of an optical burst signal.
Figure 11C:
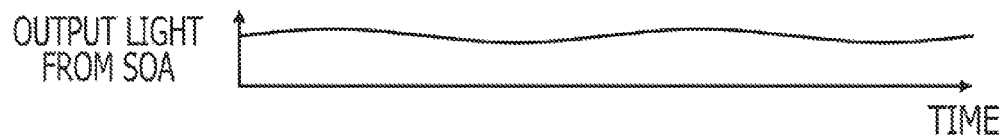
FIG. 11C is a diagram illustrating an example of a signal waveform on observed on each part when light which is input into the SOA is in the form of an optical burst signal.
Figure 12A:
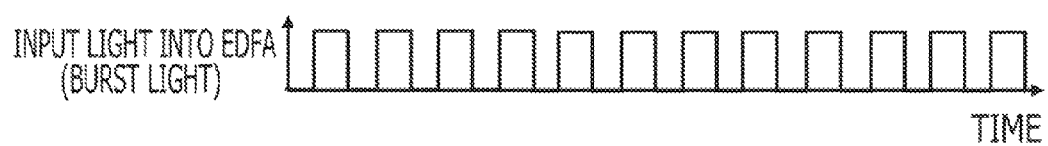
FIG. 12A is a diagram illustrating an example of a signal waveform observed on each part when an EDFA is used in place of the SOA.
Figure 12B:
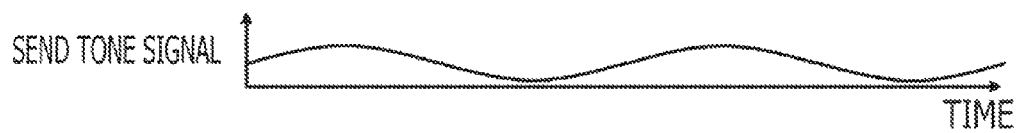
FIG. 12B is a diagram illustrating an example of a signal waveform observed on each part when the EDFA is used in place of the SOA.
Figure 12C:
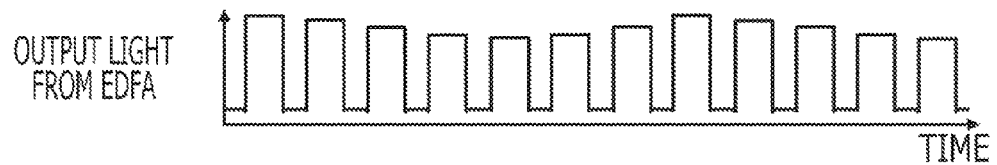
FIG. 12C is a diagram illustrating an example of a signal waveform observed on each part when the EDFA is used in place of the SOA.

Next, a case in which light which is input into the SOA is in the form of an optical burst signal will be considered. In the above mentioned case, although the spectrum of the input light into the SOA is substantially the same as that of the continuous light which is illustrated in the example in FIG. 7A, when the input light is observed in time base, the input light has a signal waveform in which ON and OFF states are intermittently repeated as illustrated in the example in FIG. 11A. Incidentally, the signal waveform illustrated in FIG. 11A is a schematic waveform of the optical burst signal and more specifically speaking, higher-speed modulation (for example, NRZ modulation at a speed of 10 Gb/s) is performed on an ON-state section of the signal. A low-frequency supervisory control tone signal as illustrated in the example in FIG. 11B is superimposed on the drive (current) signal of the SOA, so that although the output light from the SOA is slightly modulated corresponding to the frequency of the supervisory control tone signal, the total power of the output light is not varied with intermittently changing the power of the input light as illustrated in the example in FIG. 11C. Therefore, it may become possible to extract the supervisory control tone signal which is the same as that obtained in sending the signal and hence to obtain the supervisory control information regardless of intermittent changing of the power of the optical burst signal by performing synchronous detection using the tone signal receive circuit on the sink side. With respect to a process to be performed in receiving the signal light, the original optical burst signal may be obtained by removing the ASE light of the wavelength band other than that of the signal light using the BPF, so that the optical burst signal may be normally processed using the optical receiver.

In the case that the optical burst signal is input into an optical amplifier such as an EDFA or the like and the amplitude of the optical burst signal is amplified using the above mentioned optical amplifier, even if the power of the input light is changed within a range of values with which the relation expressed by above mentioned formulae (2) are met, the total power of the output light from the EDFA will be varied with changing the input light power. That is, the light which is output from EDFA into which the optical burst signal is input will be in the form of a burst signal in which ON and OFF states are intermittently repeated. Thus, in the case that a drive current on which the supervisory control tone signal is superimposed is supplied to the EDFA and the amplitude of the optical burst signal is amplified, light which is output from the EDFA will have a form in which a feeble supervisory control tone signal is superimposed on burst signal light as illustrated in the example in FIG. 12C. Thus, even if synchronous detection corresponding to the frequency of the supervisory control tone signal is performed on the sink side, any supervisory control tone signal will not be extracted from the signal light and hence supervisory control information will not be obtained.

As described above, in the optical communication network according to the embodiment, it may become possible to readily realize a supervisory control system at a low cost regardless of the forms of the up signal light and down signal light with no installation of another line and another wavelength source (another light source) between the optical repeater 5 and the OLT 1 disposed on the communication path.

Incidentally, in the above mentioned example of the embodiment, the network is configured such that both of the operations of transmitting the supervisory control information from the OLT 1 to the optical repeater 5 and of transmitting the supervisory control information from the optical repeater 5 to the OLT 1 are performed utilizing the ASE light which is generated from the SOA. However, the down signal light is not in the form of an optical burst signal and in the form of a continuous signal, a supervisory control system using the ASE light such as an existing EDFA or the like may be applicable to transmission of the supervisory control information from the OLT 1 to the optical repeater 5. However, in the above mentioned case, if it becomes difficult to send up signal light owing to a failure or the like occurred in the optical sender 11 of the OLT 1, it will become also difficult to transmit the supervisory control information to the optical repeater 5. Thus, that down signal light is normally sent may be given as one operational condition of a network system.

Next, a specific embodiment of the optical repeater 5 employed in the example of the above mentioned embodiment will be described.

Figure 13:
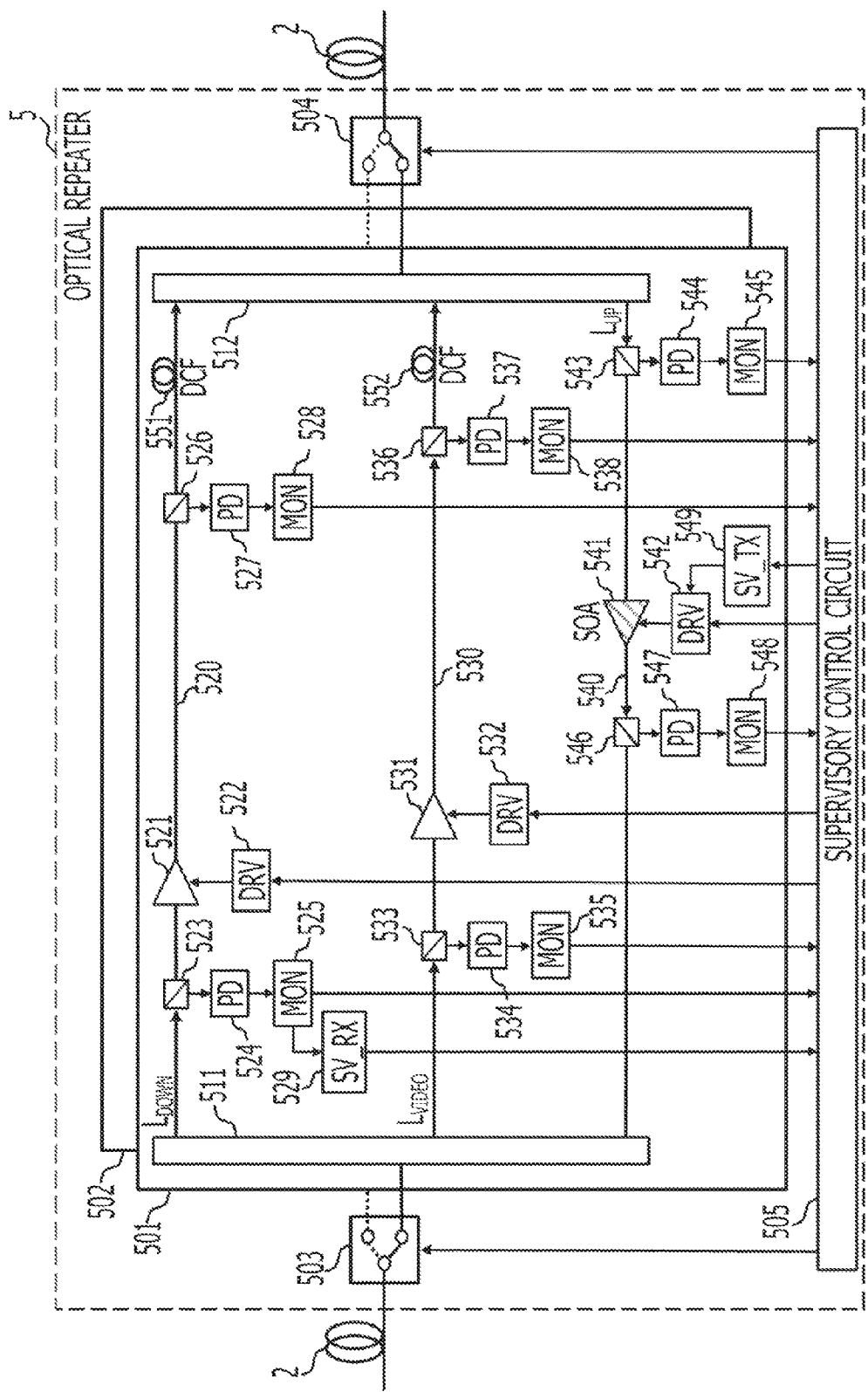
FIG. 13 is a block diagram illustrating an example of a configuration of a specific embodiment of an optical repeater.

FIG. 13 is a block diagram illustrating an example of a configuration of a specific embodiment of the optical repeater 5.

The optical repeater 5 illustrated in FIG. 13 includes a work-system 501 and a protect-system 502 which are configured in substantially the same manner as each other, two optical switches 503 and 504 for switching the system from the work-system to the protect-system or vice versa, and a supervisory control circuit 505 for controlling operations of the above-mentioned elements.

The work-system 501 includes a first path 520 through which the amplitude of down signal light $L_{DOWN}$ which is sent from the OLT 1 to each ONU 4 is amplified and a second path 530 through which the amplitude of video signal light $L_{VIDEO}$ which is broadcasted from the OLT 1 to an arbitrary ONU 4, and a third path 540 through which the amplitude of up signal light $L_{UP}$ which is sent from each ONU 4 to the OLT 1 is amplified between two WDM couplers 511 and 512. Incidentally, the protect-system 502 is configured in substantially the same manner as the work-system 501, so that description thereof will be omitted.

An optical amplifier 521 and a drive circuit (DRV) 522 for driving the optical amplifier 521 are disposed on the first path 520. The optical amplifier 521 has an amplification band width including a wavelength band of the down signal light $L_{DOWN}$. For example, in the case that the wavelength band of the down signal light $L_{DOWN}$ is set in a range from 1574 to 1600 nm which is obtained when the 10GE-PON illustrated in the example in FIG. 4 is used, an EDFA for L-band use, an SOA which is configured to cope with the wavelength band concerned or the like may be applied as the optical amplifier 521. In addition, a light receiving element (PD) 524 and a monitor circuit (MON) 525 which are used to monitor light which is input into the optical amplifier 521 are disposed at the front stage of the optical amplifier 521 and a light receiving element (PD) 527 and a monitor circuit (MON) 528 which are used to monitor light which is output from the optical amplifier 521 are disposed at the rear stage of the optical amplifier 521. In addition, a tone signal receive circuit (SV_RX) 529 is connected with the monitor circuit 525. The tone signal receive circuit 529 performs synchronous detection corresponding to the frequency of the supervisory control tone signal on an electric signal which is output from the monitor circuit 525, identifies supervisory control information sent from the OLT 1 on the basis of a result of the synchronous detection and sends the identified supervisory control information to the supervisory control circuit 505. In the example illustrated in FIG. 13, a distributed compensation fiber (DCF) 551 for performing distributed compensation on the down signal light $L_{DOWN}$ is disposed on the first path 520. However, the DCF 551 may be eliminated.

An optical amplifier 531 and a drive circuit (DRV) 532 for driving the optical fiber 531 are disposed on the second path 530. The optical amplifier 531 has an amplification band width including the wavelength band of the video signal light $L_{VIDEO}$. For example, in the case that the wavelength band of the video signal light $L_{VIDEO}$ is set in the vicinity of 1550 nm which is obtained when the 10G-PON illustrated in FIG. 4 is used, an EDFA for C-band use, an SOA which is configured to cope with the wavelength band concerned or the like may be applied as the optical amplifier 531. In addition, a light receiving element (PD) 534 and a monitor circuit (MON) 535 which are used to monitor light which is input into the optical amplifier 531 are disposed at the front stage of the optical amplifier 531 and a light receiving element (PD) 537 and a monitor circuit (MON) 538 which are used to monitor light which is output from the optical amplifier 531 are disposed at the rear stage of the optical amplifier 521. In the example illustrated in FIG. 13, a distributed compensation fiber (DCF) 552 for performing distributed compensation on the video signal light $L_{VIDEO}$ is disposed on the second path 530 as in the case on the first path 520. However, the DCF 552 may be also eliminated.

An SOA 541 and a drive circuit (DRV) 542 for driving the SOA 541 are disposed on the third path 540. The SOA 541 has an amplification band width including the wavelength band of the up signal light $L_{UP}$ (the wavelength band ranging from 1260 to 1280 nm which is obtained when the 10GE-PON illustrated in FIG. 4 is used). A tone signal send circuit (SV_TX) 549 is connected with the drive circuit 542. The tone signal send circuit 549 generates a supervisory control tone signal in accordance with supervisory control information which is sent from the supervisory control circuit 505 and outputs the generated supervisory control tone signal to the drive circuit 542. The drive circuit 542 generates a drive (current) signal on which the supervisory control tone signal which is sent from the tone signal send circuit 549 is superimposed and sends the SOA 541 the generated drive (current) signal. In addition, a light receiving element (PD) 544 and a monitor circuit (MON) 545 which are used to monitor light which is input into the SOA 541 are disposed at the front stage of the SOA 541 and a light receiving element (PD) 547 and a monitor circuit (MON) 548 which are used to monitor light which is output from the SOA 541 are disposed at the rear stage of the SOA 541.

In the optical repeater which is configured as mentioned above, the supervisory control circuit 505 judges whether the optical amplifiers 521 and 531 and the SOA 541 normally operate on the basis of results of monitoring operations performed using the respective monitor circuits 525, 528, 535, 538, 545 and 548 of the work-system 501. In the case that it has been judged that the above mentioned optical amplifiers and the SOA normally operate, the respective optical switches 503 and 504 are changed over such that input and output ports of the optical repeater 5 which is connected with the optical fiber 2 are coupled to the work-system 501. On the other hand, in the case that a failure has been detected from the optical amplifier 521 or 531, or the SOA 541, the respective optical switches 503 and 504 are changed over such that the input and output ports of the optical repeater 5 are coupled to the protect-system 502. In addition, the supervisory control circuit 505 controls optical amplifying operations performed using the optical amplifiers 521, 531 and the SOA 541 in accordance with the supervisory control information which has been identified using the tone signal receive circuit 529 and has been sent from the OLT 1, and generates supervisory control information to be sent to the OLT 1 and sends the generated supervisory control information to the tone signal send circuit 549. The supervisory control information is transmitted to the OLT 1 by utilizing ASE light which is generated from the SOA 541.

In the explanation of the specific embodiment of the optical repeater 5, an example in which the tone signal receive circuit 529 identifies the supervisory control information sent from the OLT 1 using the electric signal which is output from the monitor circuit 525 corresponding to the first path 520 through which the down signal light $L_{DOWN}$ is propagated has been given. As an alternative, the supervisory control information may be subjected to an identifying process using an electric signal which is output from the monitor circuit 535 corresponding to the second path 530 through which the video signal light $L_{VIDEO}$ is propagated.

In addition, in the explanation of the embodiment of the optical communication network, an example in which the optical repeater is disposed on the communication path which is networked so as to cope with the 10GE-PON and the optical repeater is subjected to supervisory control utilizing the ASE light which is generated from the SOA 541 has been described. The above mentioned embodiment may be effectively utilized even in the case that a supervisory control system which is configured to perform supervisory control regardless of the form of signal light input is to be disposed at a low cost at a position where any supervisory control has not been performed so far in both of the above mentioned communication path which is networked so as to cope with the 10GE-PON and other various types of optical communication networks, each including active components on its communication path.

Figure 14:
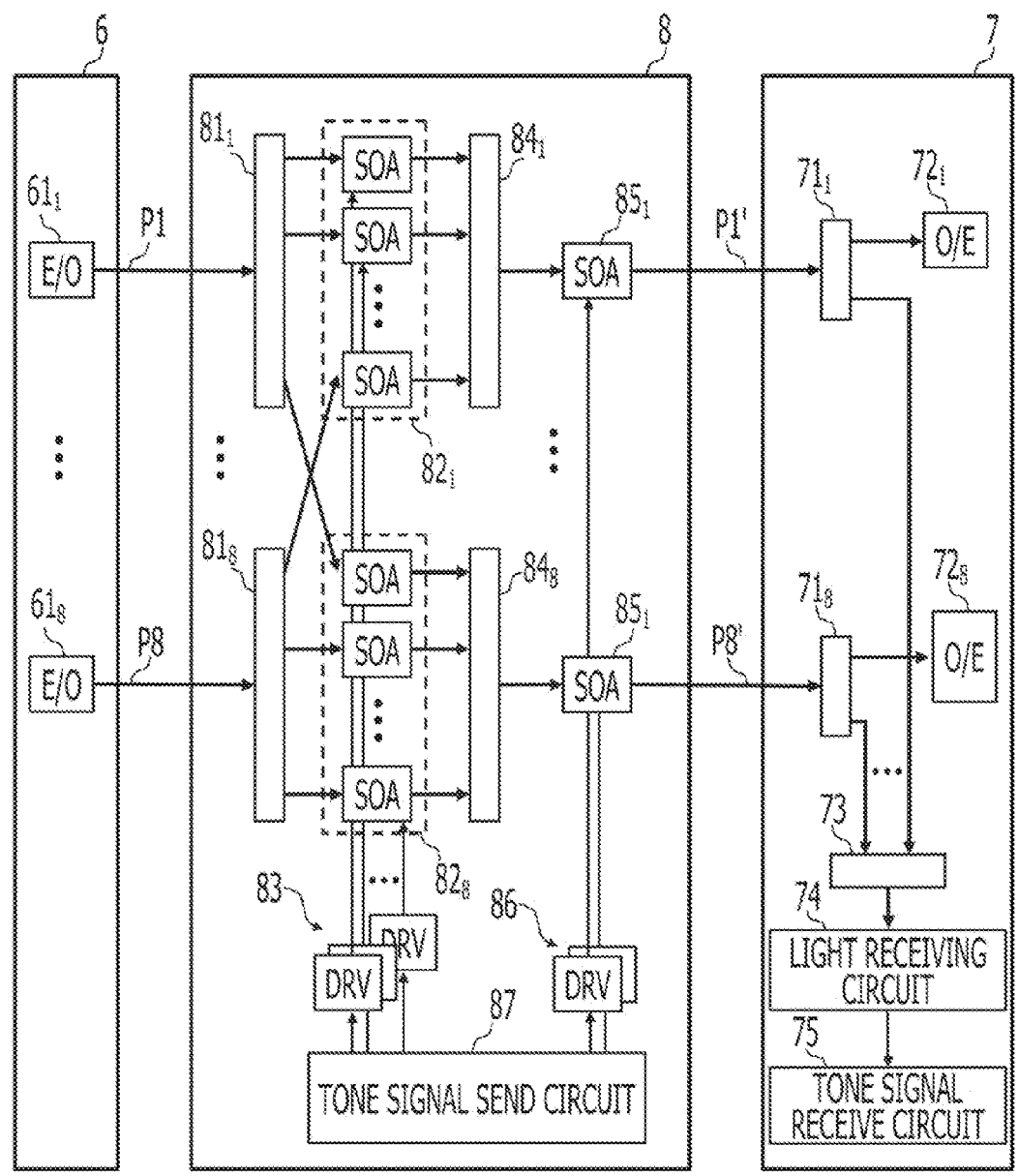
FIG. 14 is a diagram illustrating an example in which a supervisory control system is applied to an optical interconnection device.

Specifically, in the case that supervisory control is to be performed on an active component installed in an optical interconnection device, for example, as illustrated in the example in FIG. 14, a supervisory control system which is configured to perform supervisory control utilizing ASE light which is generated from an SOA of the above mentioned type may be applied. An optical interconnection device 8 illustrated in FIG. 14 operates to arbitrarily connect each of output ports P1 to P8 of eight optical senders (E/Os) $61_1$ to $61_8$ in a send node 6 with each of input ports P1' to P8' of eight optical receivers (O/Es) $72_1$ to $72_8$ in a receive nodes 7. The optical interconnection device 8 which is configured as described above is used in a part for connecting a plurality of calculation nodes with one another in the case that the plurality of calculation nodes are combined with one another as in the case in, for example, petascale computing. Thus, in some cases, the optical interconnection device 8 is installed at a position apart from both of the send node 6 and the receive node 7 and hence it may be desirable to perform supervisory control on the optical interconnection device 8 from either the send node 6 side or the receive node 7 side.

The example illustrated in FIG. 14 is configured such that a plurality of SOAs are applied as gate switches in the optical interconnection device 8 and supervisory control information on a failure or the like occurred in each SOA is transmitted to the receive node 7. Specifically, within the optical interconnection device 8, signal light which is sent from each of the output ports P1 to P8 of the send node 6 is given to each of light splitters $81_1$ to $81_8$ respectively corresponding to the output ports and is split into eight branch light rays. The branch light rays which are output from each of the light splitters $81_1$ to $81_8$ are sent to a predetermined input port of each of optical multiplexers $84_1$ to $84_8$ via each of SOAs $82_1$ to $82_8$. SOAs $85_1$ to $85_8$ are disposed at output ports of the respective optical multiplexers $84_1$ to $84_8$ and light which is output from each of the SOAs $85_1$ to $85_8$ is sent to each of the input ports P1' to P8' of the receive node 7.

The optical interconnection device 8 is configured such that supervisory control tone signals which are output from a tone signal send circuit 87 are sequentially superimposed in time series on drive currents which are supplied to the respective SOAs. Thus, light which is output from any one of the SOAs in the optical interconnection device 8 comes to include a superimposed component corresponding to the supervisory control tone signal concerned and the supervisory control information is transmitted from the optical interconnection device 8 to the receive node 7 while sequentially changing the SOA concerned. At the receive node 7, some rays of light which are given to the input ports P1' to P8' are taken out using optical splitters $71_1$ to $71_8$ and are then combined into a single ray of light using an optical multiplexer 73. The light which is output from the optical multiplexer 73 is converted to an electric signal using a light receiving circuit 74. Then, in a tone signal receive circuit 75, the electric signal which is output from the light receiving circuit 74 is subjected to synchronous detection to identify the supervisory control information sent from the optical interconnection device 8. Judgment as to whether a failure occurs in one of the SOAs in the optical interconnection device 8 is made on the basis of the supervisory control information so identified and information on a timing at which one supervisory tone signal is switched to another supervisory tone signal on the side of the optical interconnection device 8.

Supervisory control information may be transmitted between the optical interconnection device 8 and the receive node 7 which are configured as described above by utilizing the ASE light generated from each SOA regardless of whether signal light is input into each SOA in the interconnection device 8. Thus, it may become possible to monitor each SOA in the optical interconnection device 8 for failures regardless of using statuses of respective ports which are arbitrarily connected with each other using the optical interconnection device 8. In addition, the SOA to which the drive current on which the supervisory control tone signal is to be superimposed is supplied is switched in time series, so that it may become unnecessary to provide a monitor circuit corresponding to each of the plurality of SOAs on the sink side and hence the supervisory control system may be realized by a simple configuration and at a low cost. In the above description, the example in which the SOA to which the drive current on which the supervisory tone signal is to be superimposed is supplied is switched in time series has been given. However, it may be also possible to transmit a plurality of pieces of monitor control information on the plurality of SOAs at substantially the same time by making frequencies of the respective supervisory control tone signals from one another for different SOAs so as to perform synchronous detection corresponding to each frequency on the sink side.

Figure 15:
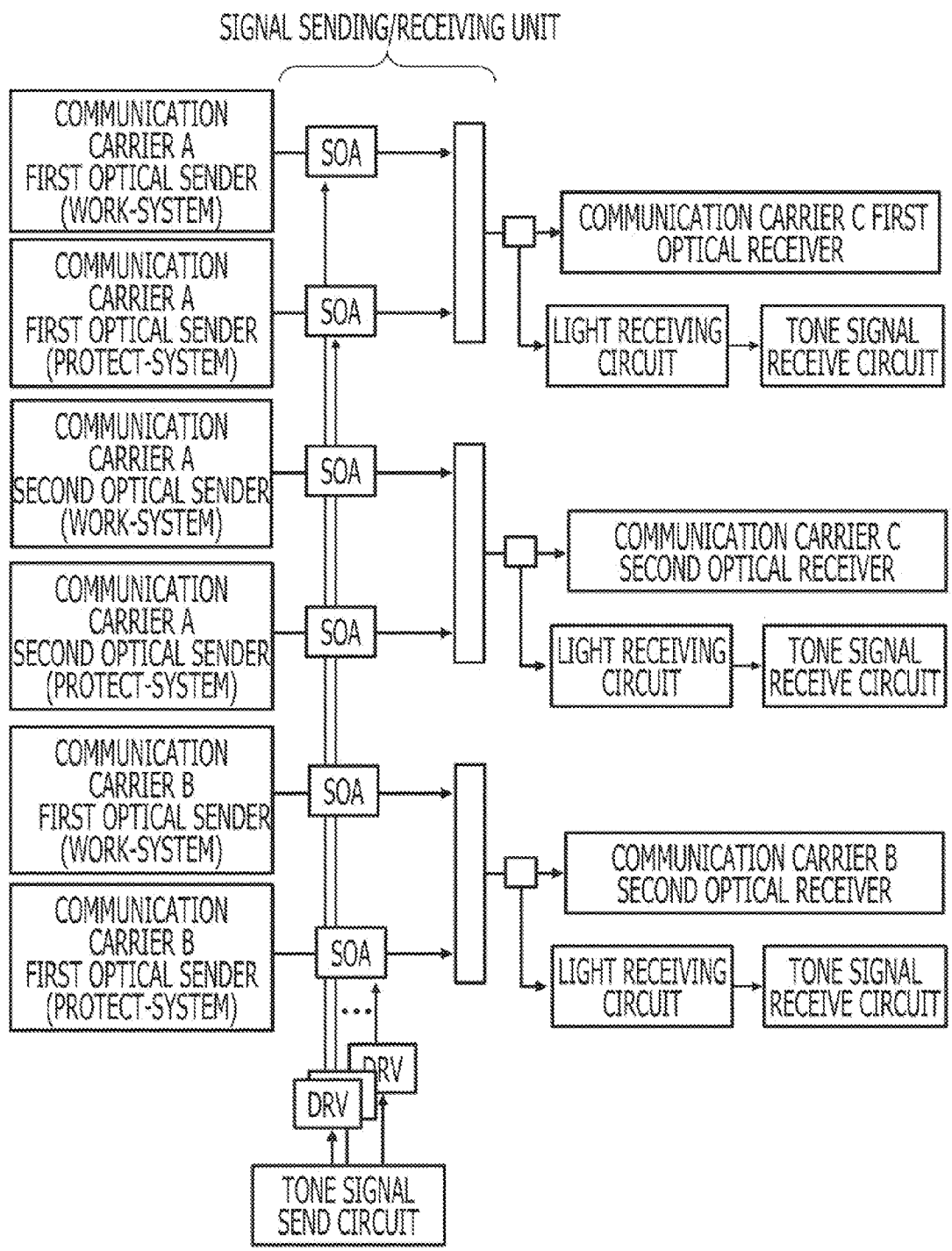
FIG. 15 is a diagram illustrating an example in which a supervisory control system is applied to a signal sending/receiving unit.

In addition, as another applied example, the above mentioned embodiment may be applied to a part (hereinafter, referred to as a "signal sending/receiving unit") of an optical communication network which is used for performing wavelength replacement and optical power level change in a section where signal light is sent/received between communication carriers and is called an alien interface. FIG. 15 is a diagram illustrating an example of a general configuration of a signal sending/receiving unit. A signal sending/receiving unit 9 as mentioned above includes SOAs and WDM couplers, does not belong to any of communication carriers A to C and may be installed at a neutral position. Thus, it may become desirable to transmit supervisory control information on the operating state of the signal sending/receiving unit 9 to an optical sender or an optical receiver that each communication carrier includes for centralized management of supervision of the signal sending/receiving unit 9. The signal sending/receiving unit 9 which is installed in an optical communication network of the type as mentioned above may be also effectively used for performing an optical power level changing process or the like by utilizing an optical amplifying function of an SOA and for transmitting supervisory control information by utilizing ASE light which is generated from the SOA.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiment has been described in detail, it should be understood that various changes, substitutions, and alterations could be made hereto without departing from the spirit and scope of the invention.

What is claimed is:

1. An optical communication network comprising:
   a plurality of optical transmission devices, each configured to include a first semiconductor optical amplifier to amplify signal light;
   a communication path that couples the optical transmission devices to one another;
   an optical repeater which is disposed on the communication path to amplify and output the signal light which is transmitted through the communication path, the optical repeater being configured to include a second semiconductor optical amplifier to amplify the signal light; and
   a supervisory controller configured to include:
      a first supervisory control circuit on one of the optical transmission devices and the optical repeater and controls a drive signal supplied to one of the first and second semiconductor optical amplifiers to modulate spontaneously emitting light according to the drive signal, the spontaneously emitting light being modulated to provide supervisory control information within a total power of light which includes the spontaneously emitting light which is output from the one of the first and second semiconductor optical amplifiers, and
      a supervisory control information receiver that receives light which has been output from another of the first and second semiconductor optical amplifiers and transmitted through the communication path, converts the received light to an electric signal and identifies the supervisory control information from an intensity-modulated component of the total power of the electric signal in at least the other one of the optical transmission devices and the optical repeater,
   wherein an optical burst signal is input into each of the first and second semiconductor optical amplifiers, a power of the optical burst signal changing in a range of levels lower than a predetermined level.

2. The optical communication network according to claim 1, wherein
   the supervisory controller includes the supervisory control information senders and the supervisory control information receivers in both of the optical transmission device and the optical repeater and performs supervisory control on the optical repeater by transmitting bi-directionally the supervisory control information between the optical transmission device and the optical repeater.

3. The optical communication network according to claim 1, wherein
   the supervisory control information sender includes a tone signal send circuit that generates a supervisory control tone signal which has a frequency lower than a modulation frequency of the signal light and an amplitude of which is changed in accordance with the supervisory control information, and
   a drive circuit that generates a drive current of a form in which the supervisory control tone signal which has been generated using the tone signal send circuit is superimposed on a fixed current used to drive each of the first and second semiconductor optical amplifiers at a predetermined gain and supplies the drive current to each of the first and second semiconductor optical amplifiers.

4. The optical communication network according to claim 3, wherein
   the supervisory control information receiver includes
   an optical splitter that splits part of light which has been output from each of the first and second semiconductor optical amplifiers and transmitted through the communication path into branch light rays,
   a light receiving circuit that converts the branch light ray obtained by splitting the light using the optical splitter into an electric signal, and
   a tone signal receive circuit that performs synchronous detection corresponding to the frequency of the supervisory control tone signal on the electric signal which is output from the light receiving circuit and performs an identifying process on a supervisory control tone signal which has been extracted by performing the synchronous detection to obtain the supervisory control information.

5. The optical communication network according to claim 1, wherein
the optical transmission device includes
a band-pass filter that extracts a light component of a wavelength band corresponding to that of the signal light from the light which has been output from each of the first and second semiconductor optical amplifiers and transmitted through the communication path and outputs the extracted component, and
an optical receiver that performs a receiving process on the light component output from the band-pass filter.

6. The optical communication network according to claim 1, wherein
the plurality of optical transmission devices include an OLT installed on the side of a communication server and a plurality of ONUs installed on the sides of users,
the optical communication network further comprises an optical splitter which is disposed on the communication path, splits down signal light which is sent from the OLT into plurality of branch signal light rays of the number corresponding to the number of users and sends the branch signal light rays to the respective ONUs, and combines signal light rays which are sent from the respective ONUs in time-division into one ray of up signal light and sends the up signal light to the OLT,
the optical repeater is disposed on the communication path between the OLT and the optical splitter, and
the supervisory controller controls to transmit the supervisory control information between the OLT and the optical repeater.

7. The optical communication network according to claim 6, wherein
the optical repeater includes a work-system that amplifies the up signal light and the down signal light, a protect-system having substantially the same configuration as the work-system, and a set of optical switches that switches the system from the work-system to the protect-system or vice versa.

8. An optical communication network comprising:
a plurality of optical transmission devices that send or receive signal light;
a communication path that couples the optical transmission devices to one another;
an optical repeater which is disposed on the communication path to amplify and output the signal light which is transmitted through the communication path; and
a supervisory controller that includes,
a supervisory control information sender which is installed on at least one of one of the optical transmission devices and the optical repeater and controls a drive signal supplied to a semiconductor optical amplifier to modulate spontaneously emitting light according to the drive signal, the spontaneously emitting light being modulated to provide supervisory control information within a total power of light which includes the spontaneously emitting light which is output from the semiconductor optical amplifier, and
a supervisory control information receiver that receives the light which has been output from semiconductor optical amplifier and transmitted through the communication path, converts the received light to an electric signal and identifies the supervisory control information on the basis of an intensity-modulated component of the total power of the electric signal in at least the other of one of the optical transmission devices and the optical repeater, and the supervisory control information sender transmits supervisory control information between the optical transmission device and the optical repeater to perform supervisory control on the optical repeater, wherein
the plurality of optical transmission devices includes a send node having a plurality of output ports, and a receive node having a plurality of input ports which are arbitrarily connected with the output ports of the send node via an optical interconnection device,
the optical interconnection device includes a plurality of semiconductor optical amplifiers that operate as gate switches, and
the supervisory controller is configured by disposing a plurality of the supervisory control information senders corresponding to the plurality of semiconductor optical amplifiers of the optical interconnection device and by disposing the supervisory control information receiver in the receive node.

9. The optical communication network according to claim 8, wherein
each of the supervisory control information senders sequentially sends a corresponding one of the semiconductor optical amplifiers in time series a drive signal which has been controlled on a basis of the supervisory control information, and
the supervisory control information receiver converts light obtained by taking out parts of light which are input into the input ports of the receive node and combining the taken-out parts together to an electric signal and identifies the supervisory control information on the basis of the intensity-modulated component of the total power of the electric signal.

10. The optical communication network according to claim 8, wherein
the supervisory control information senders respectively send the corresponding semiconductor optical amplifiers drive signals on which supervisory control tone signals which have different frequencies respectively and the amplitudes of which are changed in accordance with the supervisory control information are superimposed, and
the supervisory control information receiver converts respective parts of light rays which are input into the input ports of the receive node to electric signals, performs synchronous detecting processes respectively corresponding to the different frequencies of the supervisory control tone signals on the electric signals, and performs identifying processes on the supervisory control tone signals which have been extracted by performing the synchronous detecting processes to obtain pieces of supervisory control information corresponding to the $_{third}$ semiconductor optical amplifiers.

11. An optical communication network comprising:
a plurality of optical transmission devices that send or receive signal light;
a communication path that couples the optical transmission devices to one another;
an optical repeater which is disposed on the communication path to amplify and output the signal light which is transmitted through the communication path; and
a supervisory controller that includes, a supervisory control information sender which is installed on at least one of one of the optical transmission devices and the optical repeater and controls a drive signal supplied to a semiconductor optical amplifier to modulate spontaneously emitting light according to the drive signal, the spontaneously emitting light being modulated to provide supervisory control information within a total power of light which includes the spontaneously emitting light which is output from the semiconductor optical amplifier, and a supervisory control information receiver that receives the light which has been output from the semiconductor optical amplifier and transmitted through the communication path, converts the received light to an electric signal and identifies the supervisory control information on the basis of an intensity-modulated component of the total power of the electric signal in at least the other of one of the optical transmission devices and the optical repeater, and the supervisory control information sender transmits supervisory control information between the optical transmission device and the optical repeater to perform supervisory control on the optical repeater, wherein the plurality of optical transmission devices include optical senders and optical receivers which are connected with a signal sending/receiving unit that sends/receives signal light between different communication carriers and are owned by the communication carriers, the signal sending/receiving unit includes a plurality of semiconductor optical amplifiers that amplify and output rays of signal light sent from the optical senders of the communication carriers, and the supervisory controller is configured by disposing the plurality of supervisory control information senders corresponding to the plurality of semiconductor optical amplifiers of the signal sending/receiving unit and the plurality of supervisory control information receivers corresponding to the optical receivers of the communication carriers.

12. A supervisory controller comprising:

a semiconductor optical amplifier that amplifies and outputs an input optical burst signal; and a supervisory control information sender that controls a drive signal to be sent to the semiconductor optical amplifier to modulate spontaneously emitting light according to the drive signal, the spontaneously emitting light being modulated to provide supervisory control information within a total power of light which includes the spontaneously emitting light which is output from the semiconductor optical amplifier; and a supervisory control information receiver that receives light which has been output from a semiconductor optical amplifier of an adjacent device, converts the received light to an electric signal and identifies the supervisory control information based on an intensity-modulated component of the total power of the electric signal.

13. The supervisory controller according to claim 12, wherein an optical burst signal which is input into the semiconductor optical amplifier repeats ON and OFF states at a level lower than a predetermined power level.

* * * * *